(12) United States Patent
Dabak et al.

(10) Patent No.: US 11,747,181 B2
(45) Date of Patent: Sep. 5, 2023

(54) EXTENDED RANGE ADC FLOW METER

(71) Applicant: TEXAS INSTRUMENTS INCORPORATED, Dallas, TX (US)

(72) Inventors: Anand Dabak, Plano, TX (US); Venkata Ramanan, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/574,650

(22) Filed: Jan. 13, 2022

(65) Prior Publication Data

US 2022/0136878 A1 May 5, 2022

Related U.S. Application Data

(63) Continuation of application No. 17/008,156, filed on Aug. 31, 2020, now Pat. No. 11,255,708, which is a continuation of application No. 14/300,303, filed on Jun. 10, 2014, now Pat. No. 10,801,868.

(51) Int. Cl.
*G01F 1/66* (2022.01)
*G01F 1/667* (2022.01)
*G06F 17/15* (2006.01)

(52) U.S. Cl.
CPC .............. *G01F 1/66* (2013.01); *G01F 1/662* (2013.01); *G01F 1/667* (2013.01); *G06F 17/15* (2013.01)

(58) Field of Classification Search
CPC . G01F 1/66; G01F 1/662; G01F 1/667; G06F 17/15
See application file for complete search history.

(56) References Cited

U.S. PATENT DOCUMENTS 3,498,290 A * 3/1970 Shaw ............... A61B 8/06
367/90
4,183,244 A 1/1980 Kohno
(Continued)

FOREIGN PATENT DOCUMENTS

CN 101006328 A 7/2007
CN 101922954 A 12/2010
(Continued)

OTHER PUBLICATIONS

PCT International Search Report; PCT/US 2015/035210; dated Sep. 17, 2015, 2 pages.
(Continued)

*Primary Examiner* — Manuel A Rivera Vargas
*Assistant Examiner* — Yaritza H Perez Bermudez
(74) *Attorney, Agent, or Firm* — Ming Wai Choy; Frank D. Cimino

(57) ABSTRACT

A method of calculating a time difference is disclosed. The method includes sampling a first ultrasonic signal ($r^{21}$) to produce a first sampled signal (y1(i)) and sampling a second ultrasonic signal ($r^{12}$) to produce a second sampled signal (y2(i)). A first time (LEAD_LAG) is determined between a time the first sampled signal crosses a threshold (θ1) and a time the second sampled signal crosses the threshold. The first sampled signal is cross correlated with the second sampled signal to produce a second time (SAMP_OFFSET). The time difference is calculated in response to the first and second times.

19 Claims, 16 Drawing Sheets

(56) References Cited

U.S. PATENT DOCUMENTS

| | | | |
|---|---|---|---|
| 4,280,365 A * | 7/1981 | Connery | G01F 1/663 367/90 |
| 4,596,133 A * | 6/1986 | Smalling | G01N 29/4454 73/24.01 |
| 4,748,857 A | 6/1988 | Nakagawa | |
| 4,754,650 A * | 7/1988 | Smalling | G01N 29/024 73/861.28 |
| 4,856,321 A * | 8/1989 | Smalling | G01F 1/662 73/40.5 A |
| 5,814,737 A | 9/1998 | Brown | |
| 6,119,070 A | 9/2000 | Beneteau | |
| 6,293,156 B1 * | 9/2001 | Shen | G01F 1/7082 73/861.26 |
| 6,330,831 B1 * | 12/2001 | Lynnworth | G01F 1/662 73/861.28 |
| 6,535,206 B1 | 3/2003 | Xu | |
| 6,634,240 B1 | 10/2003 | Wallen | |
| 6,944,557 B2 * | 9/2005 | Hama | G06F 3/0433 702/66 |
| 9,689,726 B2 | 6/2017 | Ramamurthy | |
| 10,801,868 B2 * | 10/2020 | Dabak | G01F 1/662 |
| 11,255,708 B2 * | 2/2022 | Dabak | G06F 17/15 |
| 2002/0143479 A1 | 10/2002 | Fukuhara | |
| 2005/0288873 A1 * | 12/2005 | Urdaneta | G01F 1/66 137/487.5 |
| 2006/0064013 A1 * | 3/2006 | Ake | G06F 3/0418 600/437 |
| 2007/0084286 A1 * | 4/2007 | Ajay | G01N 1/2205 73/597 |
| 2010/0288055 A1 | 11/2010 | Mueller | |
| 2014/0012518 A1 * | 1/2014 | Ramamurthy | G01F 1/668 702/48 |
| 2014/0107950 A1 * | 4/2014 | Dabak | G01F 1/66 702/48 |
| 2014/0303910 A1 * | 10/2014 | Dabak | G04F 10/00 702/176 |
| 2014/0318268 A1 * | 10/2014 | Sorensen | G01P 5/245 73/861.27 |
| 2015/0292926 A1 | 10/2015 | Takemura | |
| 2015/0355001 A1 * | 12/2015 | Dabak | G06F 17/15 702/48 |
| 2016/0334250 A1 * | 11/2016 | Sathyanarayana | G01F 1/662 |
| 2017/0082650 A1 * | 3/2017 | Hies | G01P 5/245 |
| 2018/0274957 A1 * | 9/2018 | Dabak | H04B 11/00 |
| 2020/0400472 A1 * | 12/2020 | Dabak | G01F 1/66 |

FOREIGN PATENT DOCUMENTS

| | | |
|---|---|---|
| CN | 102589627 A | 7/2012 |
| FR | 2781048 A1 | 1/2000 |
| JP | 2009074879 A | 4/2007 |
| WO | WO200003207 A1 | 1/2000 |
| WO | WO2013079074 A1 | 6/2013 |

OTHER PUBLICATIONS

Extended European Search Report from EP 15807199.3; dated Jan. 31, 2018; 10 pages.

Notification of CN First Office Action and Search Report; dated Dec. 4, 2018; 5 pages.

State Intellictual Property Office of PRC Notification of Second Office Action and Search Report For, Z16111354EPCN, Application No. 2015800308138; dated Jun. 4, 2019; 4 pages.

* cited by examiner

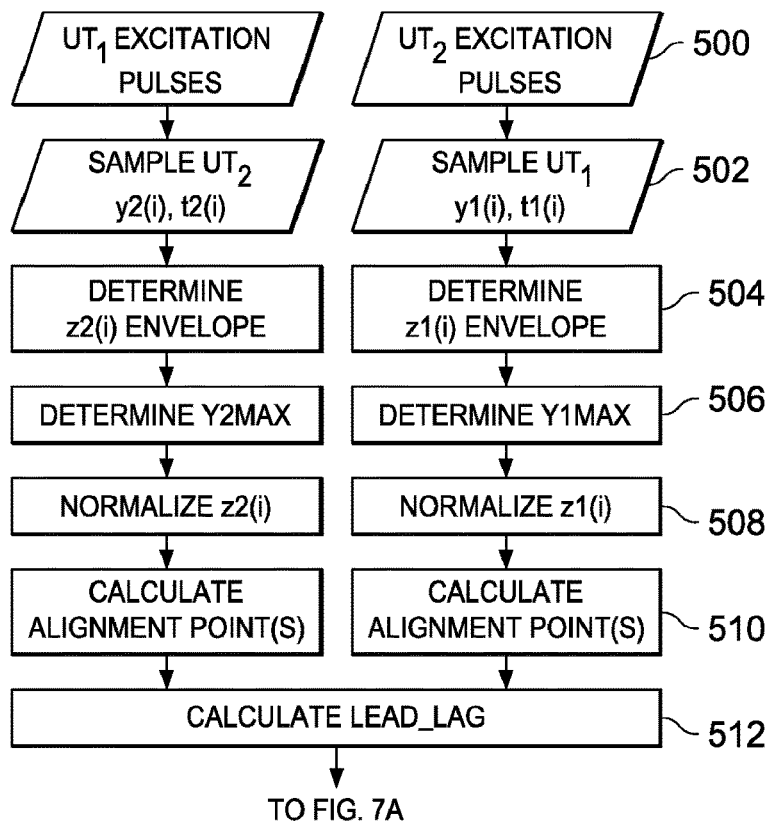
FIG. 5A
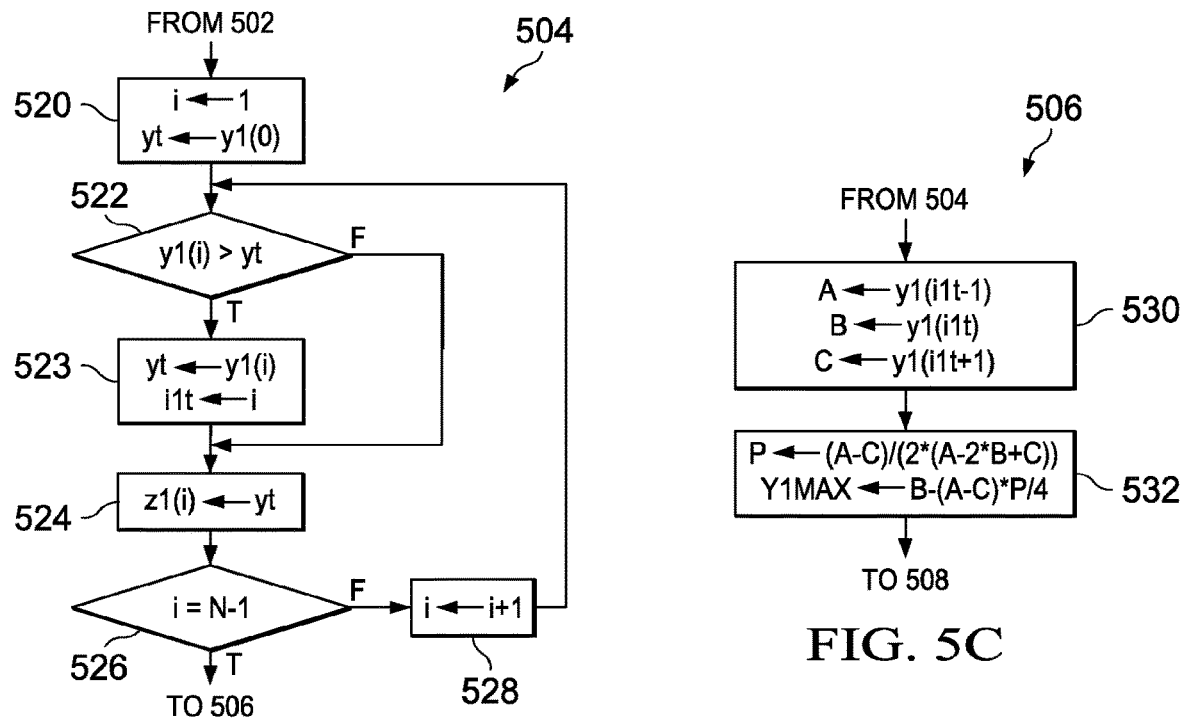
FIG. 5B
FIG. 5C

| DIFFERENTIAL DELAY OFFSET (SECONDS) | Re_LL | SAMP_OFFSET | STANDARD DEVIATION IN ERROR (ps) |
|---|---|---|---|
| 0.00E+00 | 0.0 | 0 | 0.00 |
| 5.00E-08 | 0.0 | 0 | 28.20 |
| 1.00E-07 | 0.0 | 0 | 10.71 |
| 1.50E-07 | 0.3 | 1 | 73.49 |
| 2.00E-07 | 0.9 | 1 | 62.77 |
| 2.50E-07 | 1.0 | 1 | 14.03 |
| 3.00E-07 | 1.0 | 1 | 49.06 |
| 3.50E-07 | 1.0 | 1 | 70.00 |
| 4.00E-07 | 1.2 | 2 | 8.25 |
| 4.50E-07 | 1.9 | 2 | 13.14 |
| 5.00E-07 | 2.0 | 2 | 17.04 |
| 5.50E-07 | 2.0 | 2 | 10.79 |
| 6.00E-07 | 2.0 | 2 | 4.66 |
| 6.50E-07 | 2.2 | -1 | 642.54 |
| 7.00E-07 | 2.9 | -1 | 989.64 |
| 7.50E-07 | 3.0 | -1 | 1152.13 |
| 8.00E-07 | 3.0 | -1 | 1089.64 |
| 8.50E-07 | 3.0 | -1 | 771.11 |
| 9.00E-07 | 3.2 | 0 | 705.05 |
| 9.50E-07 | 3.9 | 0 | 1040.43 |
| 1.00E-06 | 4.0 | 0 | 1144.78 |
| 1.05E-06 | 4.0 | 0 | 1057.65 |
| 1.10E-06 | 4.0 | 0 | 716.02 |
| 1.15E-06 | 4.2 | 1 | 633.59 |
| 1.20E-06 | 4.9 | 1 | 969.40 |
| 1.25E-06 | 5.0 | 1 | 1130.22 |

FIG. 11

EXTENDED RANGE ADC FLOW METER

CROSS-REFERENCE TO RELATED APPLICATION

This application is a continuation of U.S. Nonprovisional application Ser. No. 17/008,156 filed Aug. 31, 2020, which is a continuation of U.S. Nonprovisional application Ser. No. 14/300,303, filed Jun. 10, 2014 (now U.S. Pat. No. 10,801,868), all of which are incorporated by reference herein in their entirety.

BACKGROUND OF THE INVENTION

Embodiments of the present invention relate to analog-to-digital (ADC) sampling of ultrasonic signals to determine fluid velocity.

Ultrasound technology has been developed for measuring fluid velocity in a pipe of known dimensions. Typically, these measurement solutions use only analog processing and limit the accuracy and flexibility of the solution. Ultrasound velocity meters may be attached externally to pipes, or ultrasound transducers may be places within the pipes. Fluid flow may be measured by multiplying fluid velocity by the interior area of the pipe. Cumulative fluid volume may be measured by integrating fluid flow over time.

FIG. 1 illustrates an example of positioning ultrasonic transducers for fluid velocity measurement. There are many alternative configurations, and FIG. 1 is just an example for the purpose of illustrating some basic equations for ultrasound measurement of fluid velocity. Two ultrasonic transducers $UT_1$ and $UT_2$ are mounted inside a pipe 100, and a fluid is flowing through the pipe with velocity V. L is the distance between the ultrasonic transducers $UT_1$ and $UT_2$ and θ is the angle between the dashed line connecting the transducers and the wall of the pipe. Propagation time $t_{12}$ or time of flight (TOF) is the time for an ultrasonic signal to travel from $UT_1$ to $UT_2$ within the fluid. Likewise, propagation time $t_{21}$ is the TOF for an ultrasonic signal to travel from $UT_2$ to $UT_1$ within the fluid. If C is the velocity of the ultrasonic signal in the fluid and V is the velocity of the fluid in pipe 100, these propagation times are given by equations [1] and [2].

$$t_{12} = \frac{L}{C + V\cos(\theta)} \quad [1]$$

$$t_{21} = \frac{L}{C - V\cos(\theta)} \quad [2]$$

The angle θ and the distance L are known, and the objective is to measure the fluid velocity V. If the velocity C of the ultrasonic signal in the fluid is known, then only the difference between propagation times $t_{12}$ and $t_{21}$ is needed. However, the velocity C is a function of temperature, and a temperature sensor may or may not be included based on the target cost of the measurement system. In addition, a flow meter may be used for different fluids such as water, heating oil, and gas. Measuring two different propagation times ($t_{12}$ and $t_{21}$) cancels the variability of C. Combining equations [1] and [2] yields equation [3] for the fluid velocity V.

$$V = \frac{L}{2} * \frac{t_{21} - t_{12}}{t_{21}t_{12}} \quad [3]$$

Therefore, to determine fluid velocity without knowing the velocity of an ultrasonic signal in the fluid, measurement of two ultrasonic propagation times ($t_{12}$ and $t_{21}$) are needed. The present inventors have realized a need to improve measurement techniques in terms of cost and accuracy. Accordingly, the preferred embodiments described below are directed toward improving upon the prior art.

BRIEF SUMMARY OF THE INVENTION

In a preferred embodiment of the present invention, a method of calculating a time difference is disclosed. The method includes sampling a first ultrasonic signal to produce a first sampled signal and sampling a second ultrasonic signal to produce a second sampled signal. A first time is determined between a time the first sampled signal crosses a threshold and a time the second sampled signal crosses the threshold. The first sampled signal is cross correlated with the second sampled signal to produce a second time. The time difference is calculated in response to the first and second times.

BRIEF DESCRIPTION OF THE SEVERAL VIEWS OF THE DRAWING

FIG. 5A is a flow chart showing operation of signal processing circuit 208 of FIG. 2A;

FIG. 5B is a flow chart showing envelope determination 504 from sampled values of received ultrasonic signals of FIG. 5A;

FIG. 5C is a flow chart showing determination of a maximum positive signal level 506 from sampled values of received ultrasonic signals of FIG. 5A;

FIG. 11 is a table showing a standard deviation for various lead lag and sample offset values.

DETAILED DESCRIPTION OF THE INVENTION

The preferred embodiments of the present invention provide significant advantages of ultrasonic differential time of flight (ΔTOF) measurement techniques in a fluid or gas medium over methods of the prior art as will become evident from the following detailed description.

Figure 1:
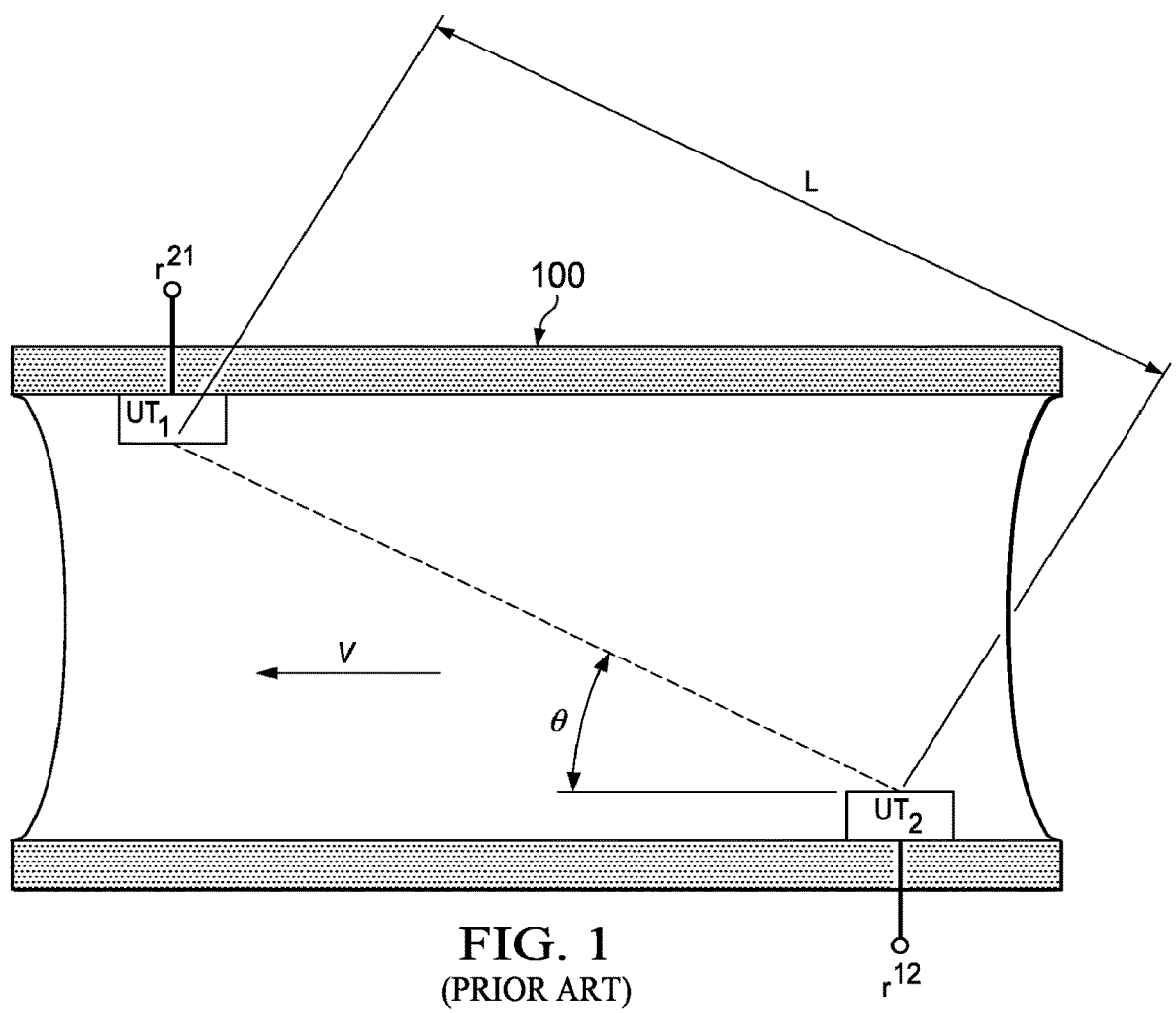
FIG. 1 is a diagram of a pipe with ultrasonic transducers for fluid flow measurement according to the prior art.
Figure 2A:
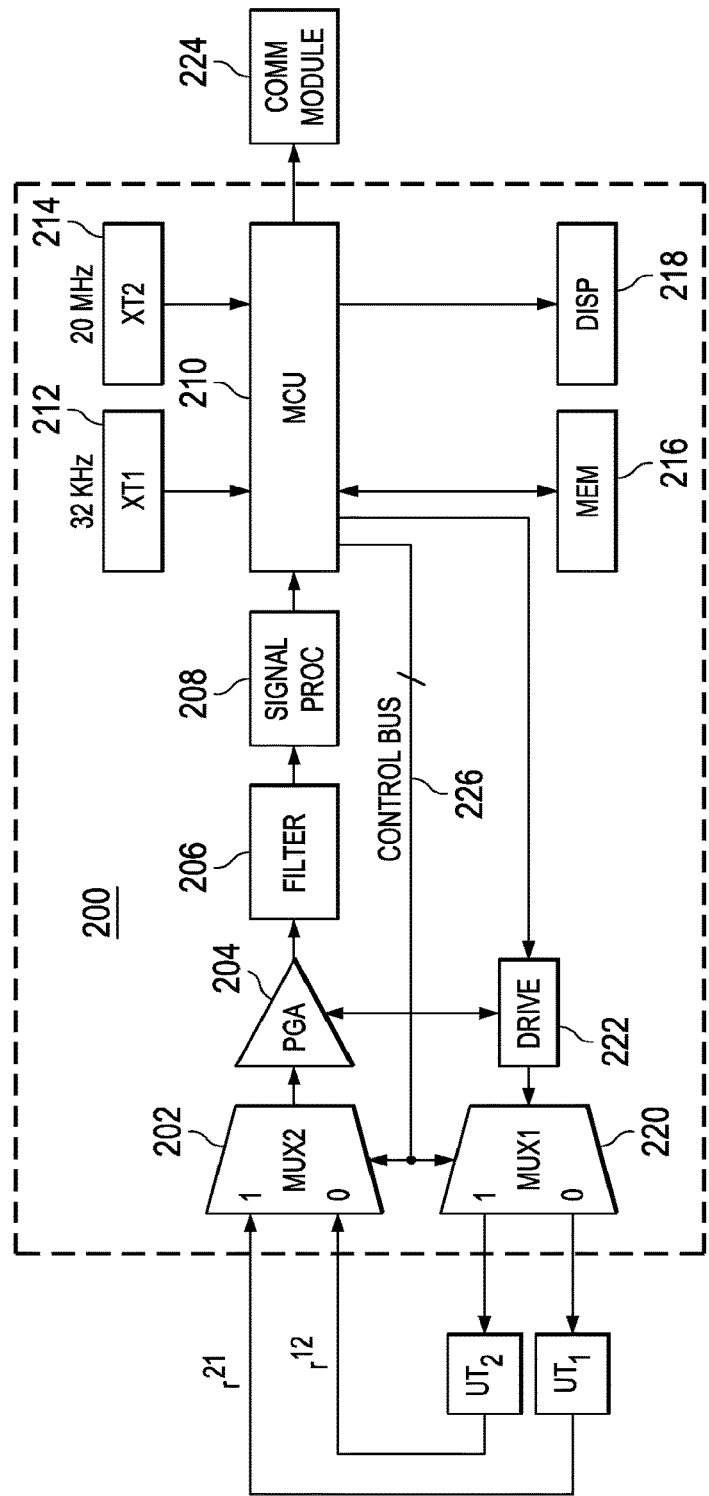
FIG. 2A is a circuit diagram of an ultrasonic measurement circuit of the present invention for measuring fluid flow.

Referring to FIG. 2A, there is a circuit diagram of an ultrasonic circuit of the present invention for measuring fluid flow. Referring back to FIG. 1, signal $r^{12}$ is the ultrasonic signal produced by transducer $UT_1$ and received from transducer $UT_2$ as given by equation 4. Likewise, signal $r^{21}$ is the ultrasonic signal produced by transducer $UT_2$ and received from $UT_1$ as given by equation 5. The center frequency of the transmitting transducer is $f_C$, and f(t) is the envelope of the received signal.

$$r^{12}=f(t)\sin(2\pi f_C t) \quad [4]$$

$$r^{21}=f(t+\delta t)\sin(2\pi_C(t+\delta t)) \quad [5]$$

The circuit 200 includes multiplex circuits 202 (MUX2) and 220 (MUX1) which are controlled by signals on control bus 226. MUX1 is coupled to receive an excitation signal from drive circuit 222 in response to micro control unit (MCU) 210. MCU 210 is coupled to memory circuit 216 and to display circuit 218. MCU 210 is also coupled to crystal oscillator circuit 212, which controls measurement times, and to crystal oscillator circuit 214, which controls excitation and sampling frequencies.

When a logical 0 from control bus 226 is applied to MUX1, the excitation signal from drive circuit 222 is applied to $UT_1$. $UT_1$ responsively transmits an ultrasonic signal to $UT_2$. $UT_2$ produces received signal $r^{21}$, which is applied to MUX2. The logical 0 applied to MUX1 is also applied to MUX2 so that $r^{21}$ is applied to programmable gain amplifier (PGA) 204. PGA 204 amplifies $r^{21}$ and applies it to filter 206. The filtered signal is then applied to signal processing unit 208 to calculate alignment points for $r^{21}$. Alternatively, when a logical 1 from control bus 226 is applied to MUX1, the excitation signal from drive circuit 222 is applied to $UT_2$. $UT_2$ responsively transmits an ultrasonic signal to $UT_1$. $UT_1$ produces received signal $r^{12}$, which is applied to MUX2. The logical 1 applied to MUX1 is also applied to MUX2 so that $r^{12}$ is applied to programmable gain amplifier (PGA) 204. PGA 204 amplifies $r^{12}$ and applies it to filter 206. The filtered signal is then applied to signal processing unit 208 to determine respective alignment points as will be described in detail. The MCU calculates the differential time of flight (ΔTOF) and fluid flow from the alignment points. The result is applied to communication module 224 and transmitted to a base station. The MCU also applies the result to display 218.

Figure 2B:
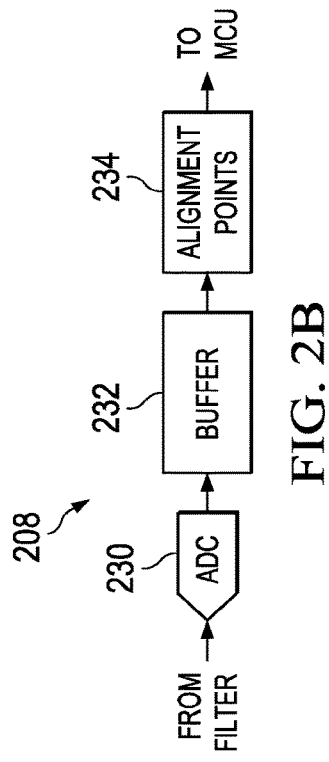
FIG. 2B is a circuit diagram showing detail of signal processing circuit 208 of FIG. 2A.

FIG. 2B is a circuit diagram showing detail of signal processing circuit 208 of FIG. 2A. The signal processing circuit alternately receives amplified and filtered ultrasonic signals from ultrasonic transducer $UT_1$ and $UT_2$. Analog-to-Digital Converter (ADC) 230 samples the received signals at a sampling frequency determined by MCU 210. The sampled signals are stored in buffer memory circuit 232. When sampled signals from both $UT_1$ and $UT_2$ are stored in buffer memory 232, circuit 234 calculates respective alignment points for each signal. Circuit 234 may be a digital signal processor, or any general purpose processor capable of real number calculations. Circuit 234 may also be a part of MCU 210 and may include both software and hardware. These alignment points are compared by MCU 210 to determine ΔTOF and fluid flow.

Figure 3A:
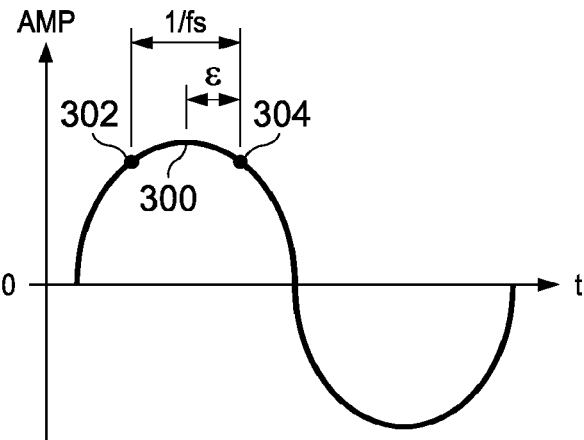
FIGS. 3A and 3B illustrate potential measurement errors due to sampling that are resolved by embodiments of the present invention.
Figure 3B:
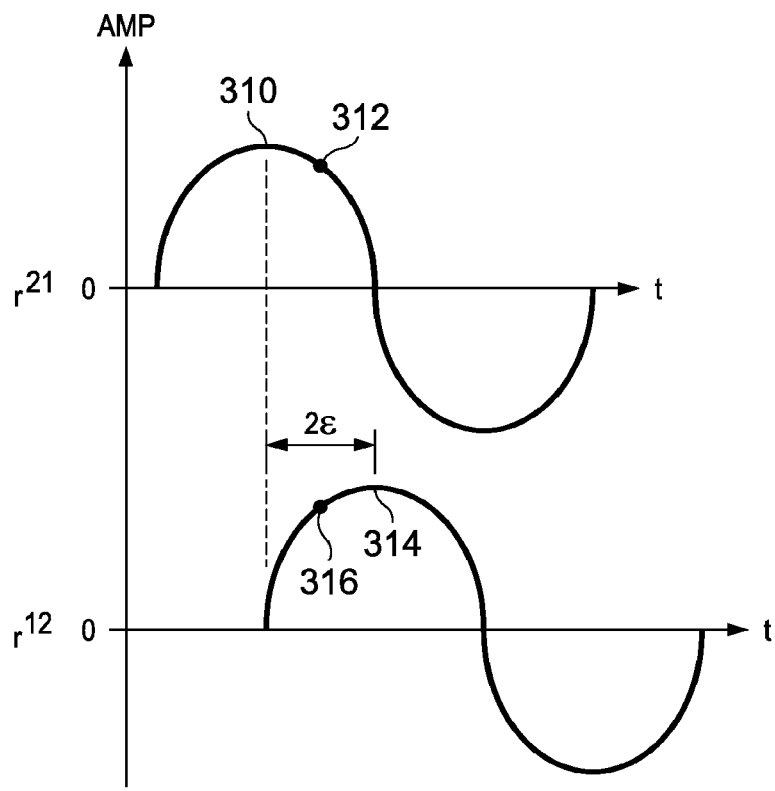

FIGS. 3A and 3B illustrate potential measurement errors due to sampling that are resolved by embodiments of the present invention. FIG. 3A illustrates a sine wave that may be applied to ADC 230 (FIG. 2B). Signal samples 302 and 304 are separated in time by the inverse of the sampling frequency fs. For example, if the sampling frequency is 1 MHz, samples 302 and 304 are separated in time by 1 μs. If the peak value 300 of the sine wave is taken as a true alignment point for signals from an ultrasonic transducer, the maximum error ε occurs when either of signal samples 302 or 304 is used for alignment points. If either of the samples 302 or 304 is used for alignment, the ΔTOF may have a worst case error of ε or 0.5 μs from either signal.

FIG. 3B illustrates sine waves $r^{21}$ and $r^{12}$ that may be applied to ADC 230 (FIG. 2B). Here, the true peak 310 of the positive half cycle of $r^{21}$ is separated in time from signal sample 312 by ε. Likewise, the true peak 314 of the positive half cycle of $r^{12}$ is separated in time from signal sample 316 by ε. If signal samples 312 and 316 are aligned to calculate ΔTOF the resulting error may be as much as 2ε. This may be an acceptable error at higher sampling frequencies. However, embodiments of the present invention are directed to improved accuracy at lower sampling frequencies, thereby reducing system noise as well as cost.

Figure 3C:
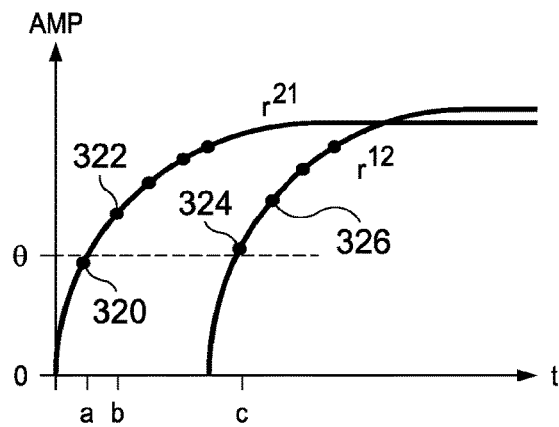
FIGS. 3C and 3D illustrate potential measurement errors due to mismatched ultrasonic transducers that are resolved by embodiments of the present invention.
Figure 3D:
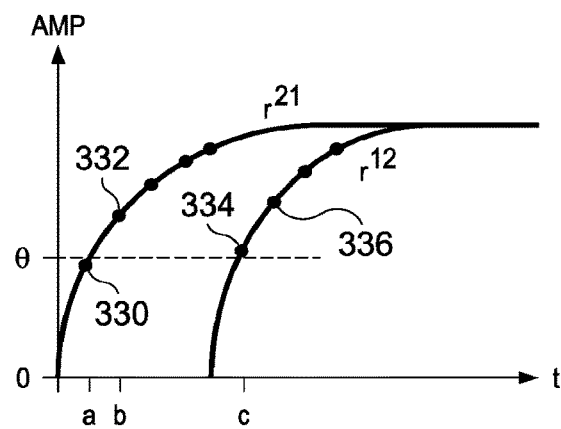

FIGS. 3C and 3D illustrate potential measurement errors due to mismatched ultrasonic transducers that are resolved by embodiments of the present invention. The transducers are fabricated separately from physical components and necessarily include some mismatch. FIG. 3C shows the envelopes of peak values of sampled signals $r^{21}$ and $r^{12}$, where the signal samples are represented by black dots 320-326. Each black dot represents a maximum sample value of one half cycle. Here, the envelope of $r^{12}$ has a greater peak amplitude than the envelope of $r^{21}$. Signal sample 324, corresponding to a first cycle of $r^{12}$, may be selected as an alignment point when it exceeds threshold θ. Signal sample 320, corresponding to a first cycle of $r^{21}$, may not be selected as an alignment point, however, since it does not exceed threshold θ due to the relatively lower amplitude. Thus, signal sample 322, corresponding to a second cycle of $r^{21}$, may be selected as an alignment point, since it does exceed threshold θ. If alignment points 322 and 324 are inadvertently selected for measurement, then the ΔTOF calculation will include a one-cycle error of 1 μs at fs=1 MHz.

FIG. 3D shows the envelopes of maximum sample values of signals $r^{21}$ and $r^{12}$, where the signal samples are represented by black dots 330-336. Here, the envelope of $r^{12}$ has the same amplitude as $r^{21}$ but a faster rise time than the envelope of $r^{21}$. Signal sample 334, corresponding to a first cycle of $r^{12}$, may be selected as an alignment point when it exceeds threshold θ. Signal sample 330, corresponding to a first cycle of $r^{21}$, may not be selected as an alignment point, however, since it does not exceed threshold θ due to the relatively slower rise time. Thus, signal sample 332, corresponding to a second cycle of $r^{21}$, may be selected as an alignment point, since it does exceed threshold θ. If alignment points 332 and 334 are inadvertently selected for measurement, then the ΔTOF calculation will include a one-cycle error of 1 μs at fs=1 MHz.

Figure 4A:
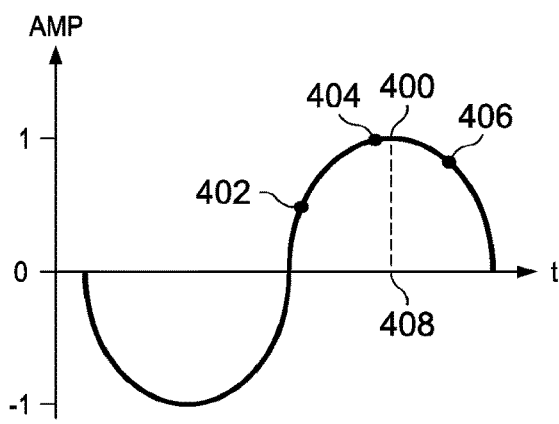
FIG. 4A is a diagram of a sine wave illustrating parabolic interpolation to determine a local peak value from sampled values.

Referring now to FIG. 4A, there is a diagram of a sine wave illustrating parabolic interpolation to determine a local maximum value from sampled values. The method is given at https://ccrma.stanford.edu/~jos/parshl/Peak_Detection_Steps_3.html. The three signal samples 402 through 406 are used to approximate the true peak 400 of the positive half cycle as well as the time 408 of the true peak as will be described in detail. Accuracy of the approximation depends on the ratio of the sampling frequency fs to the transducer center frequency fc. This approximation is reasonably accurate for a ratio of 4. However, accuracy is improved when the ratio is at least 6 (fs/fc=6), thereby providing at least 3 signal samples for each half cycle. Alignment points determined by parabolic interpolation, therefore, align signals $r^{12}$ and $r^{21}$ based on the time of the interpolated true peak of each half cycle and advantageously avoid the worst case 2ε error. Thus, accuracy of ΔTOF and fluid flow calculation are greatly improved.

Figure 4B:
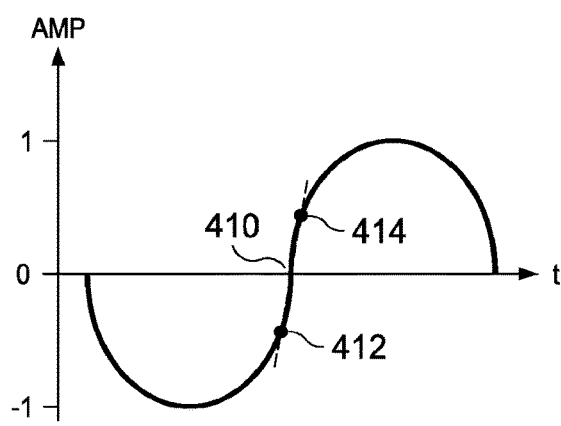
FIG. 4B is a diagram of a sine wave illustrating linear interpolation to determine a local zero crossing value from sampled values.

Referring now to FIG. 4B, there is a diagram of a sine wave illustrating linear interpolation to determine a zero crossing time 410 from signal samples 412 and 414. Accuracy of this method is comparable to parabolic interpolation and is also dependent on sampling frequency. In practice, signal samples 412 and 414 are selected to bracket the zero crossing of the sine wave. These sampled values define a line between the half cycles. The zero crossing times of ultrasonic signals $r^{12}$ and $r^{21}$ are then aligned to determine ΔTOF. Thus, accuracy of ΔTOF and fluid flow calculation are greatly improved.

Turning now to FIG. 5A, there is a flow chart showing operation of signal processing circuit 208 (FIG. 2A) and MCU 210 (FIG. 2B). The flow chart illustrates a left branch beginning with $UT_1$ excitation pulses and a right branch beginning with $UT_2$ excitation pulses 500. Both branches are the same except for different signal names, so only the right branch will be described in detail. In general, the right branch signal names include a "1" and the corresponding left branch signal names include a "2". The $UT_2$ excitation pulses are preferably 10 to 20 square wave pulses as illustrated on the left of FIG. 7A. The excitation pulses preferably have a center frequency fc near the resonant frequency of the ultrasonic transducer. The excitation pulses from $UT_2$ are received by $UT_1$ and an absolute value of the amplitude y1(i) at the time t1(i) are sampled 502 at a sample frequency fs by ADC 230 and stored in buffer memory 232 (FIG. 2B).

Envelope values of y1(i) signal samples are determined at block 504 as explained below with reference to FIG. 5B. Here, the envelope z1(i) includes increasing values of y1(i) and constant values of the current maximum y1(i) when y1(i) is decreasing. Index i is initialized to zero and temporary variable yt is initialized to y1(0) at block 520. Since sampling of the received ultrasonic signal 502 must begin prior to arrival of the signal, some initial samples may include system noise. Thus, initial samples of y1(i) having a magnitude less than a predetermined noise threshold θN (not shown) may be ignored. Decision block 522 tests whether y1(i) is greater than yt. If not (F), control passes to block 524 where z1(i) receives the current value of yt. Here, y1(i) stores the sample values and z1(i) stores the envelope values of y1(i) as will be explained in detail. Control then passes to decision block 526 to determine whether all N samples of y1(i) have been tested. If not (F), index i is incremented 528, and control passes again to decision block 522. As long as the test is false, yt holds the current maximum y1(i). When a y1(i) value is greater than yt, control passes to block 523 where yt receives a new and greater value of y1(i) and i1t receives the index i of this new current maximum value. Control then passes to block 524 where z1(i) receives the new yt. Control then passes to decision block 526 to determine if all N values of y1(i) have been tested. In this manner, each new maximum yt is stored in z1(i). Each new y1(i) that is not greater than yt is ignored, and the corresponding z1(i) is set to the current yt value. The process continues until all y1(i) have been tested. In one embodiment of the present invention, there are preferably 128 samples from $UT_1$ and another 128 samples from $UT_2$. Once all y1(i) samples are tested and all envelope values maxima are identified, decision block 526 is true and control passes to block 506.

Referring back to FIG. 5A, when all envelope values have been identified and the envelope of sample values is stored in z1(i), control passes to block 506 as shown at FIG. 5C. Index i1t is the index of the maximum y1(i) and z1(i) as determined at block 504. With i1t as the index of this maximum sample, control passes to blocks 530 and 532 where a parabolic approximation determines the true peak value Y1MAX. For example, if points 402 through 406 (FIG. 4A) are taken as A=0.4412, B=0.6919, and C=0.6646, respectively, then P=0.4012 and Y1MAX=0.7141 at point 400. If point 404 is sampled at 1.3 μs and the sample interval is 0.1 μs, then the peak 400 occurs at 1.3 μs+0.1 μs*0.4012 or 1.34 μs 408. Thus, point 404 is a local maximum value sampled at 1.3 μs, and point 400 is an approximation of the true maximum of the half cycle at 1.34 μs. It is highly advantageous to use the approximate time of the true maximum as an alignment point, since the time of sampled local maxima from $UT_1$ and $UT_2$ may differ as previously discussed with regard to FIGS. 3A and 3B.

Figure 5D:
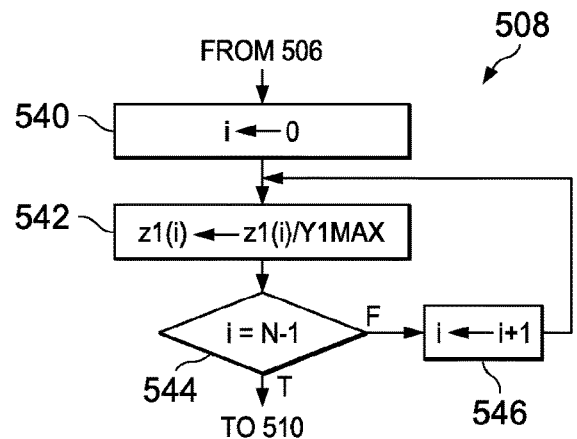
FIG. 5D is a flow chart showing normalization 508 of sampled values of received ultrasonic signals of FIG. 5A.
Figure 5E:
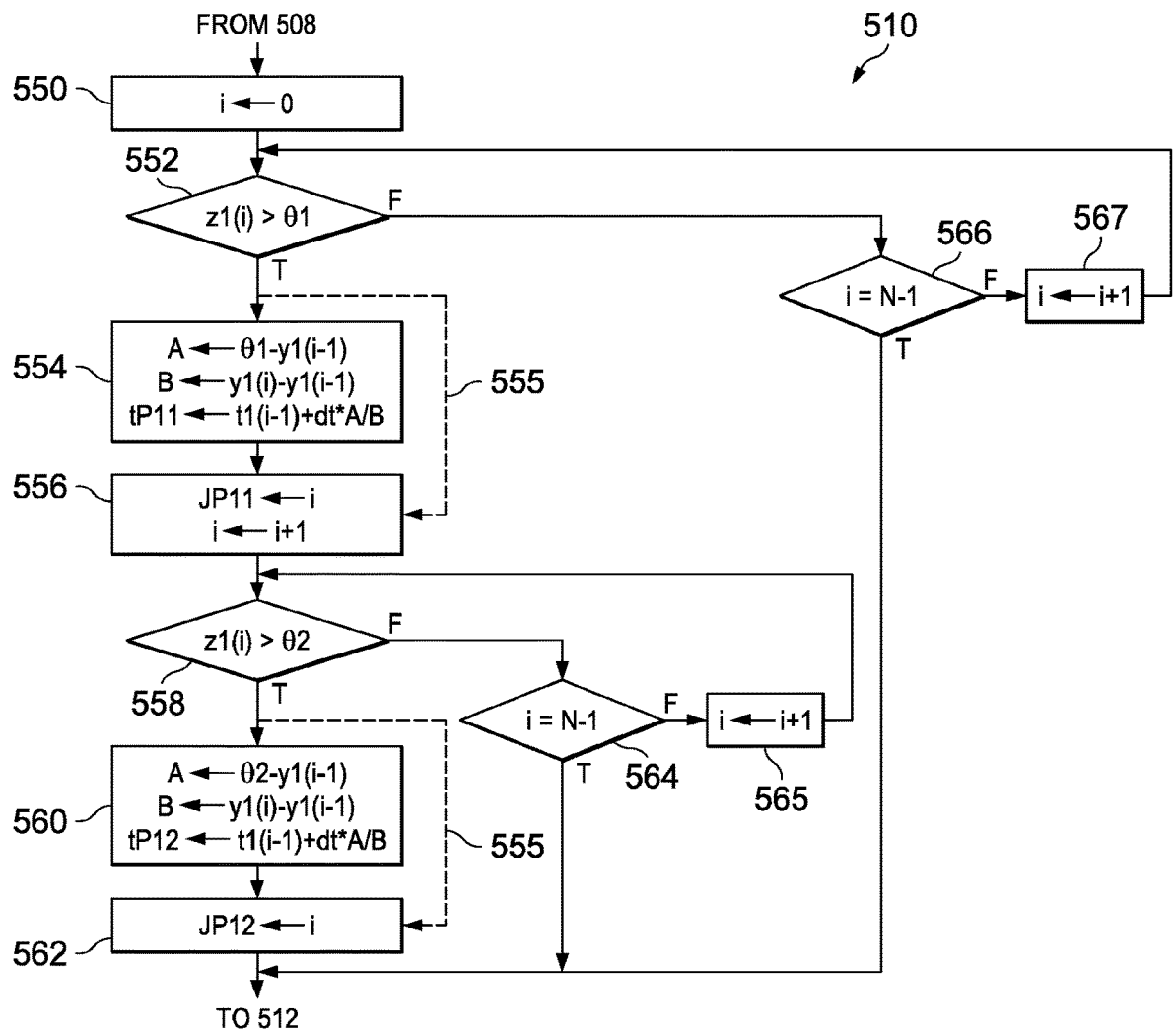
FIG. 5E is a flow chart of a first embodiment of the present invention using threshold values of received ultrasonic signals (FIG. 5A) with optional parabolic interpolation to determine alignment points 510.

Referring again to FIG. 5A, when Y1MAX is determined, z1(i) envelope values are normalized 508 as shown at FIG. 5D. Index i is initialized to zero at block 540. Control then passes to block 542 where z1(i) receives z1(i) divided by Y1MAX. Decision block 544 then determines if all z1(i) have been normalized. Here, N is the total number of envelope values. If there are more envelope values (F), i is incremented 546 and the next z1(i) sample is normalized. The process continues until all z1(i) values are normalized. The result is an envelope waveform stored in z1(i) as shown at FIG. 8B. This normalization advantageously avoids the problem of mismatched transducers having different amplitudes as previously discussed with reference to FIG. 3C.

Referring once again to FIG. 5A, after normalization control passes to block 510 where alignment points are calculated by threshold determination with optional linear interpolation. By way of example, only two alignment points are calculated in the following discussion. However, the number of alignment points may be as few as one and as many as the number of sample values permit. Index i is initialized to zero at block 550. Control then passes to block 552 where normalized envelope value z1(i) is compared to a first threshold θ1. In one embodiment, θ1 is preferably 25% of the maximum envelope value. If z1(i) is less than θ1, control passes to decision block 566 to determine if all z1(i) have been tested. If not, i is incremented 567 and control returns to decision block 552. This process continues until z1(i) is greater than θ1 (T). Control then passes to block 554 to interpolate a time value tP11 when the envelope z1(i) crosses the θ1 threshold. For example, if θ1 is 0.25, y1(i−1) is 0.23 at 8 µs, and y1(i) is 0.31 at 9 µs, tP11 is 8.25 µs. Alternatively, if the sample interval dt (1/fs) is sufficiently small, control may pass directly to block 556 via path 555 and omit block 554. At block 556 the current value of i is stored in JP11. This is the index of the z1(i) sample that first exceeds threshold θ1. Index i is then incremented and control then passes to decision block 558.

Decision block 558 tests whether z1(i) is greater than θ2. In one embodiment, θ2 is preferably 50% of the maximum envelope value. If not (F), decision block 564 determines if all z1(i) have been tested. If not, i is incremented 565 and control passes again to decision block 558. This process continues until a current z1(i) is greater than θ2 (T). Control then passes to block 560 to interpolate a time value tP12 when the envelope z1(i) crosses the θ2 threshold. As previously discussed, if the sample interval dt is sufficiently small, control may pass directly to block 562 via path 555 and omit block 560. At block 562 the current value of i is stored in JP12. This is the index of the z1(i) sample that first exceeds threshold θ2.

Figure 5F:
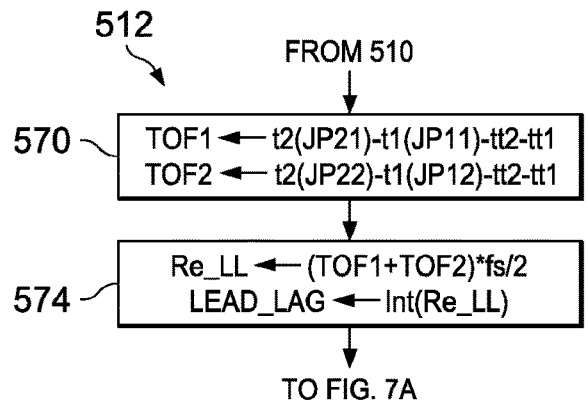
FIG. 5F is a flow chart showing calculation of differential time of flight 512 (FIG. 5A) from sampled received ultrasonic signals.
Figure 5G:
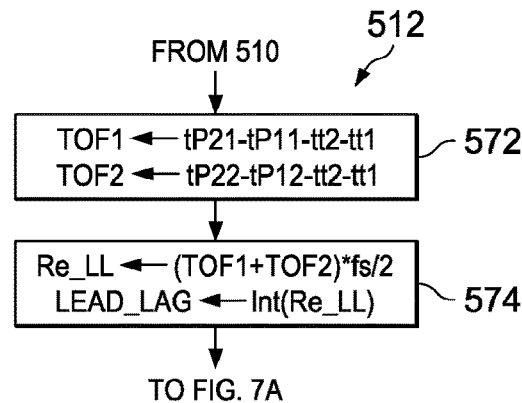
FIG. 5G is a flow chart showing calculation of differential time of flight 512 (FIG. 5A) from interpolated received ultrasonic signals.
Figure 5H:
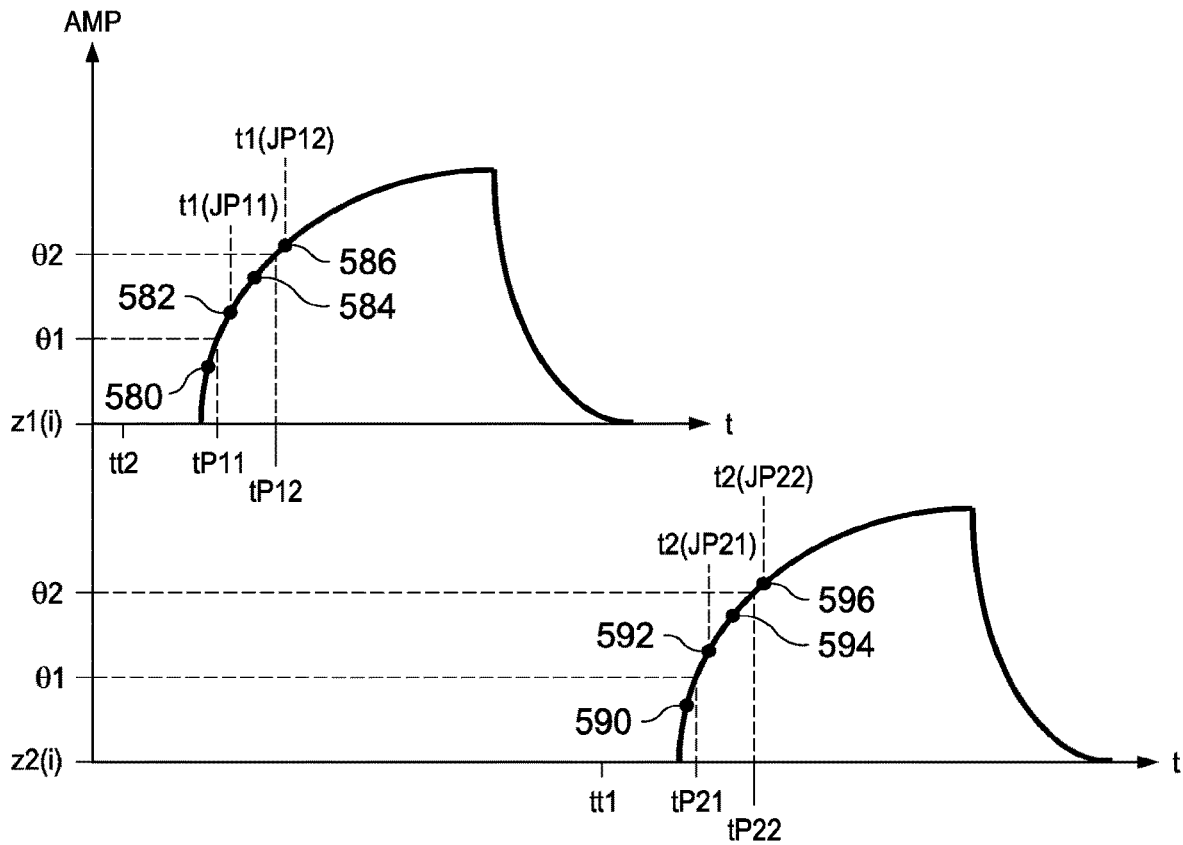
FIG. 5H is a diagram showing alignment points from right (upper) and left (lower) branch received signal envelopes of FIG. 5A.

Referring to FIG. 5H, the preceding values for the right branch of FIG. 5A are illustrated in the upper curve for envelope z1(i). The corresponding values for the left branch of FIG. 5A are illustrated in the lower curve for envelope z2(i). The time the upper curve leads or lags the lower curve is LEAD_LAG time. Referring first to the upper curve, transmit time tt2 is the time transducer $UT_2$ transmits an ultrasonic pulse to transducer $UT_1$. By way of example, sample 582 is the first normalized value of z1(i) that is greater than threshold θ1, and the preceding normalized value 580 is less than threshold θ1. Block 554 interpolates time tP11 at threshold θ1 as previously described. Alternatively, if sample interval dt is sufficiently small, time t1(JP11) of sample 582 may be used in lieu of tP11 to calculate LEAD_LAG time. In a similar manner, sample 586 is the first normalized value of z1(i) that is greater than threshold θ2, and the preceding normalized value 584 is less than threshold θ2. Block 560 interpolates time tP12 at threshold θ2 as previously described. Alternatively, if sample interval dt is sufficiently small, time t1(JP12) of value 586 may be used in lieu of tP12 to calculate LEAD_LAG time of flight.

Referring to the lower curve of FIG. 5H corresponding to the left branch of FIG. 5A, transmit time tt1 is the time transducer $UT_1$ transmits an ultrasonic pulse to transducer $UT_2$. Sample 592 is the first normalized value of z2(i) that is greater than threshold θ1, and the preceding normalized value 590 is less than threshold θ1. Block 554 interpolates time tP21 at threshold θ1 as previously described. Alternatively, if sample interval dt is sufficiently small, time t2(JP21) of sample 592 may be used in lieu of tP21 to calculate LEAD_LAG time. In a similar manner, sample 596 is the first normalized value of z2(i) that is greater than threshold θ2, and the preceding normalized value 594 is less than threshold θ2. Block 560 interpolates time tP22 at threshold θ2 as previously described. Alternatively, if sample interval dt is sufficiently small, time t2(JP22) of value 596 may be used in lieu of tP22 to calculate LEAD_LAG.

Referring back to FIG. 5A, block 512 uses the alignment points determined by block 510 using the sample indices JP11, JP12, JP21, and JP22 at FIG. 5F. Block 570 calculates the values TOF1 and TOF2 corresponding to thresholds θ1 and θ2, respectively. TOF1 is taken as a time difference between alignment points t2(JP21) and t1(JP11) from respective left and right branches less their respective transmit times tt2 and tt1. TOF2 is taken as a difference between alignment points t2(JP22) and t2(JP12) from respective left and right branches less their respective transmit times tt2 and tt1. Control then passes to block 574 where TOF1 and TOF2 are averaged to produce a real value Re_LL of LEAD_LAG time. An integer value of Re_LL is then stored in LEAD_LAG.

The embodiment of block 512 at FIG. 5G uses the alignment points calculated by block 510 using the interpolated times tP11, tP12, tP21, and tP22 as previously discussed. Block 572 calculates values TOF1 and TOF2 corresponding to thresholds θ1 and θ2, respectively. TOF1 is taken as a time difference between alignment points tP21 and tP11 from respective left and right branches less their respective transmit times tt2 and tt1. TOF2 is taken as a difference between alignment points tP22 and tP12 from respective left and right branches less their respective transmit times tt2 and tt1. Control then passes to block 574 where TOF1 and TOF2 are averaged to produce a real value Re_LL of LEAD_LAG time. An integer value of Re_LL is then stored in LEAD_LAG.

Figure 6:
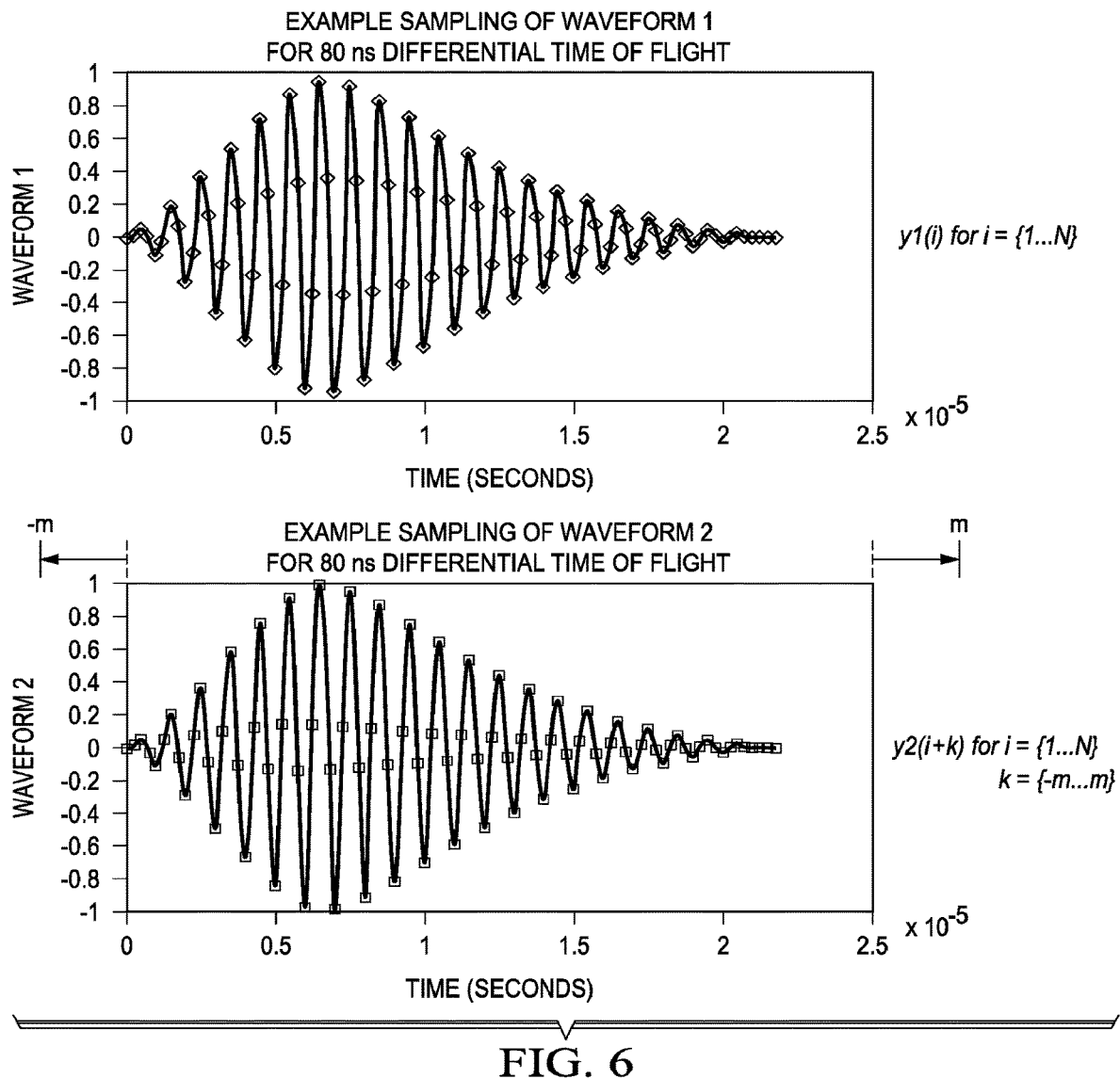
FIG. 6 is a diagram of sampled waveforms y1($i$) and y2($i$) as in FIG. 5A.

Turning now to FIG. 6, there is a diagram of sampled waveforms y1(i) and y2(i) as in FIG. 5A for an exemplary center frequency (fc) of 1 MHz and a sample frequency (fs) of 4 MHz. Individual samples are indicated by small geometries and connected by lines. It is important to note that the peak samples of each cycle are not the same as the peaks of the sampled waveform for each cycle. Cross correlation of y1(i) with y2(i) is stored in cross correlation array CORR as shown in equation [6] for N samples where k varies from −m to m.

$$CORR(k) = \sum_{i=1}^{N} y1(i) y2(i+k) \quad [6]$$

As shown in FIG. 6, this is similar to sliding a y2(i) sample array from −m to m and multiplying them by corresponding samples of y1(i). Samples of y2(i+k) for i+k less than 1 or greater than N are ignored or treated as zero. A sum of products for each k is stored in cross correlation array CORR(k).

Figure 7A:
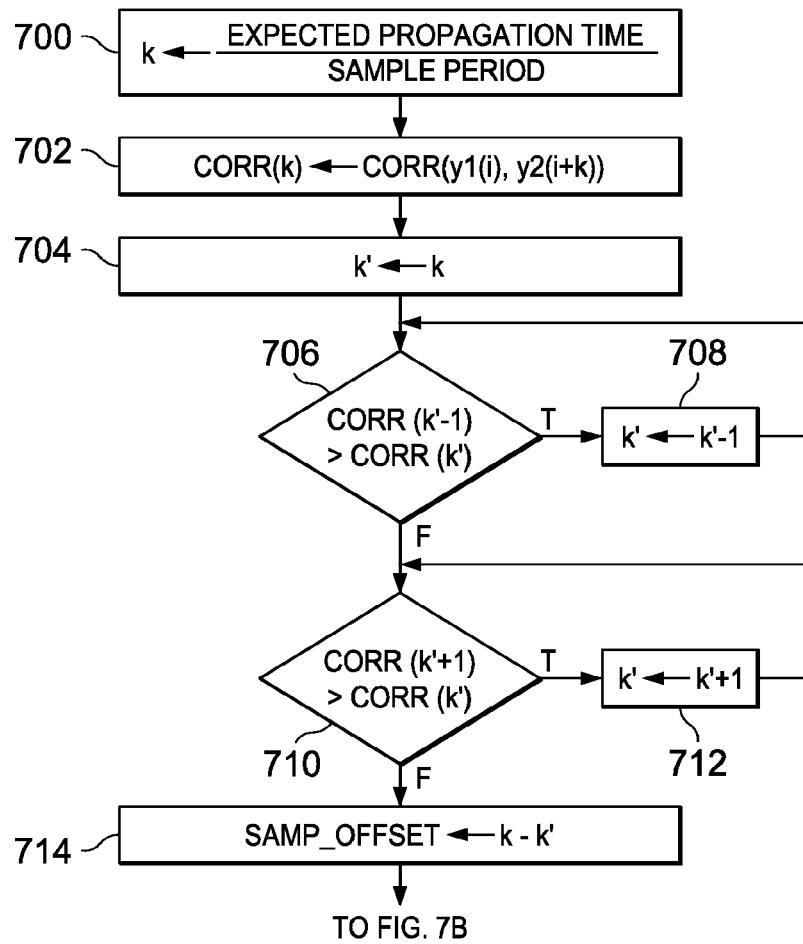
FIG. 7A is a flow chart showing sample offset SAMP_OFFSET from cross correlation of y1($i$) and y2($i$)

FIG. 7A is a flow chart showing determination of a sample offset SAMP_OFFSET from the cross correlation of y1(i) and y2(i). At step 700 an initial value of k is computed by dividing the expected differential propagation time by the sample period (1/fs). The expected differential propagation time may be zero representing zero fluid flow. Alternatively, the expected differential propagation time may be taken from a preceding measurement. Cross correlation is then performed according to equation [6], and the result is stored in CORR(k). Subsequent cross correlation values are calculated as needed. At step 704, index k is stored in k'. At step 706, if CORR(k'−1) is greater than CORR(k') then at step 708 k' is replaced by k'−1, and step 706 is repeated. At step 710, if CORR(k'+1) is greater than CORR(k') then at step 712 k' is replaced by k'+1, and step 710 is repeated. When step 710 is complete, index k' points to a maximum cross correlation value in CORR(k'). At step 714, a sample offset SAMP_OFFSET is set to k−k', and flow continues at FIG. 7B.

Figure 7B:
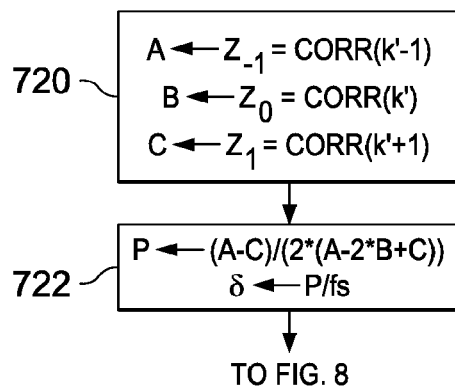
FIG. 7B is a flow chart showing parabolic approximation of δ (FIG. 9A) from cross correlation values.
Figure 9A:
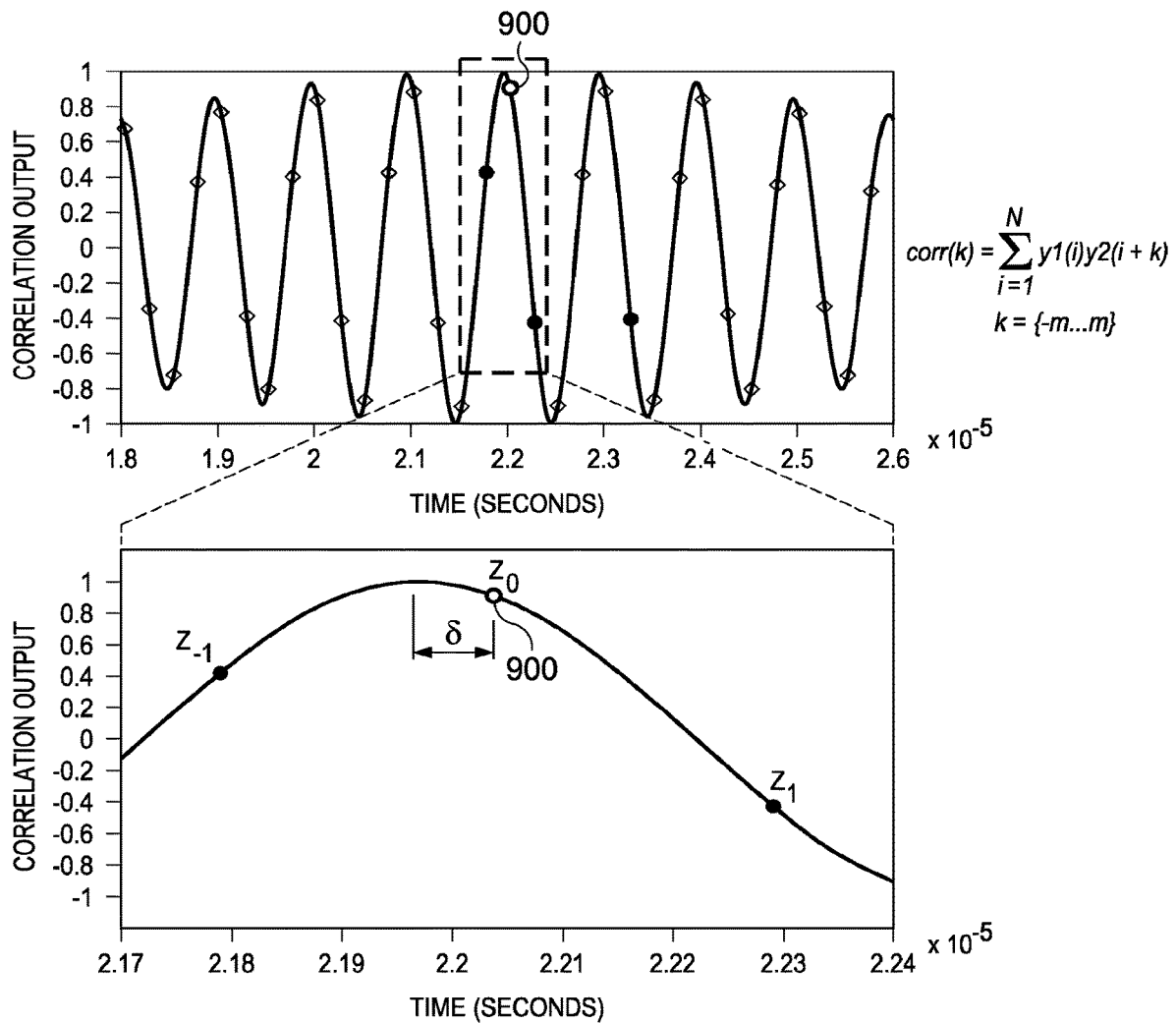
FIGS. 9A through 9E are examples of differential time of flight (ΔTOF) determination for various sample values.

FIG. 7B is a flow chart showing parabolic approximation of δ (FIG. 9A) from cross correlation values computed at FIG. 7A. The resolution of the discrete cross correlation values may be insufficient to provide the accuracy needed for the differential propagation time. The actual differential propagation time may be between two discrete sample times. Interpolation can provide an improved estimate. The shape of the cross correlation function through the peak is approximately a cosine curve or a parabola. Accordingly, a cosine function or a parabolic function may be used for interpolation through three samples of CORR(k). For example, the values of $Z_{-1}$, $Z_0$, and $Z_1$ at FIG. 9A are 0.4818, 0.8763, and −0.4818, respectively. These respective values (A, B, and C) are used in block 720 for the parabolic function approximation. Using these values at block 722 produces a value of P=−0.275. Thus, δ=P/fs=−68.75 ns. The true value of δ, however, is −80 ns.

The cosine function approximation below is generally more accurate than the parabolic function approximation. This is because a cross correlation of the two sinusoids $y1(i)$ and $y2(i)$ is a sinusoid in CORR(i). Using the same values for A, B, and C, equation [7] provides ω=1.571. Using this value of w in equation [8] provides φ=0.5027. Finally, these values of ω and φ in equation [9] produce a value of δ=−80 ns.

$$\omega = \cos^{-1}\left(\frac{A+C}{2B}\right) \quad [7]$$

$$\varphi = \tan^{-1}\left(\frac{A-C}{2B\sin(\omega)}\right) \quad [8]$$

$$\delta = \left(\frac{-\varphi}{\omega fs}\right) \quad [9]$$

Figure 8:
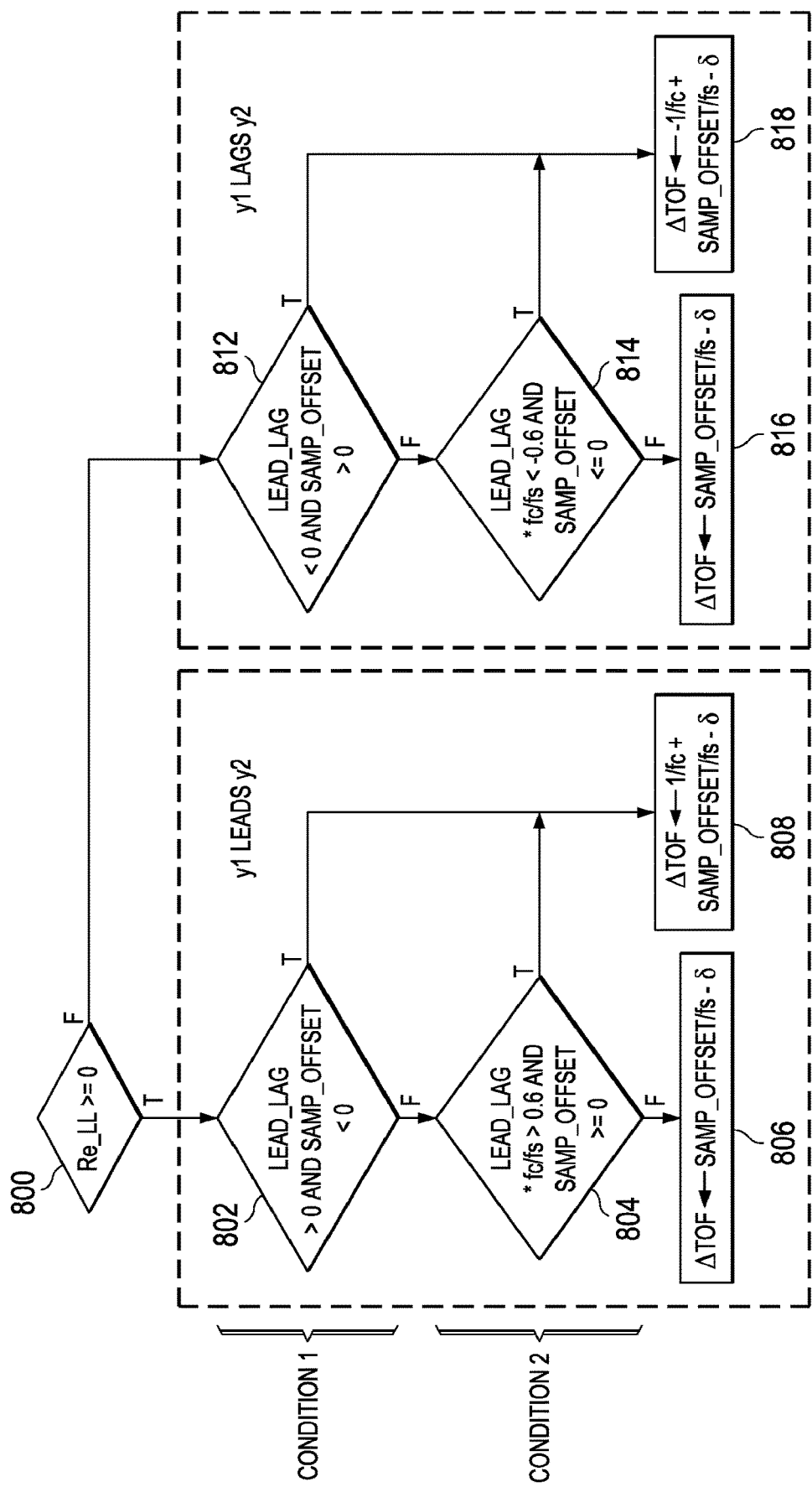
FIG. 8 is a flow chart showing determination of differential time of flight (ΔTOF)

Turning now to FIG. 8, there is a flow chart showing determination of differential time of flight (ΔTOF) using independent estimates of differential time of flight calculated at FIGS. 5A through 5G and FIG. 7A. The first estimate of FIGS. 5A through 5G determines a difference between a time the first sampled signal $y1(i)$ crosses a threshold and a time the second sampled signal $y2(i)$ crosses the threshold. The second estimate of FIG. 7A is independent of the first estimate, because it cross correlates the first sampled signal with the second sampled signal to determine a time difference between the first sampled signal $y1(i)$ and the second sampled signal $y2(i)$. The second estimate, therefore, does not depend on a threshold crossing as with the first estimate.

These independent estimates are used to correct cycle slip and sample slip errors as will be explained in detail. A cycle slip error occurs when a cross correlation peak is identified on an incorrect cycle. A sample slip error occurs when an incorrect cross correlation sample is identified that may be on a correct cycle. The flow chart includes a left branch and a right branch. Block 800 determines if Re_LL is greater than or equal to 0. If true, y1 leads y2 and flow proceeds along the left branch to block 802. If false, y1 lags y2 and flow proceeds along the right branch to block 812. Blocks 802 and 812 are similar except for different inequalities. Likewise, blocks 804 and 814 are similar except for different inequalities. These blocks represent two similar conditional tests in each branch of the flow chart that are used to determine differential time of flight. If Re_LL is greater than or equal to zero and either block 802 or 804 is true, block 808 determines the differential time of flight (ΔTOF). Alternatively, if Re_LL is less than zero and either block 812 or 814 is true, block 818 determines ΔTOF. If both conditions of either the left or right branch are false, blocks 816 or 806, respectively, determine ΔTOF.

The flow chart of FIG. 8 will be explained with reference to the examples shown in FIGS. 9A through 9E. In the following discussion waveform y1 leads waveform y2. Cross correlation samples shown by small geometries are superimposed on the upper waveform of FIG. 9A for fc=1 MHz and fs=4 MHz. Also, for FIG. 9A δ=−80 ns. The three samples of interest indicated in the dashed box which is expanded in the lower waveform are $Z_{-1}$=0.4818, $Z_0$=0.8763, and $Z_1$=−0.4818. Sample 900 is the cross correlation value of the initial k index at block 700. At block 704, k' is initially set equal to k. (FIG. 7A). Recall from FIG. 7A that block 706 tests whether CORR(k'−1) is greater than CORR(k'), and block 710 tests whether CORR(k'+1) is greater than CORR(k'). Both tests will be false, since CORR(k'−1)=$Z_{-1}$ is less than CORR(k')=$Z_0$ and CORR(k'+1)=$Z_1$ is less than CORR(k'). Thus, SAMP_OFFSET is set to zero at block 714. Since the time difference of upstream and downstream waveforms crossing a threshold (θ1, θ2 FIG. 5E) is less than a sample time (1/fs), LEAD_LAG is equal to zero. Thus, both tests 802 and 806 will prove false and block 806 will determine ΔTOF.

Figure 9B:
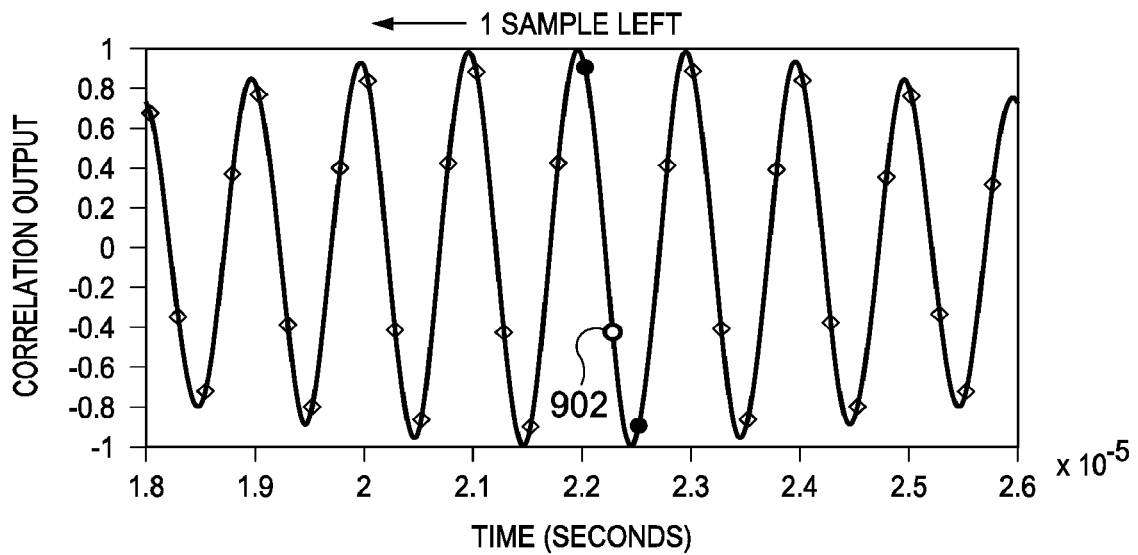

FIG. 9B illustrates a second example of the flow chart of FIG. 8 for the cross correlation waveform of FIG. 9A. Here, the timing offset between upstream and downstream waveforms is 330 ns (80 ns+250 ns) and cross correlation sample 902 is the cross correlation value of the initial k index at block 700. At block 704, k' is initially set equal to k. (FIG. 7A). Block 706 tests whether CORR(k'−1) is greater than CORR(k'). Sample CORR(k'−1) is the first sample to the left of sample 902 and is greater than CORR(k'). Block 708 then subtracts one from k', so that CORR(k') effectively moves one sample to the left to what was previously CORR(k'−1). Block 706 again tests whether CORR(k'−1) is greater than CORR(k'). This time the test is false and control passes to block 710. The test at block 710 is also false, and block 714 sets SAMP_OFFSET to one. Since the time difference of upstream and downstream waveforms crossing a threshold (θ1, θ2 FIG. 5E) is greater than a sample time (1/fs) LEAD_LAG=1. But the test at block 802 is false, because SAMP_OFFSET=1. The test at block 804 is false, because the product of LEAD_LAG and fc/fs is less than 0.6. Thus, block 806 will set ΔTOF to 250 ns+80 ns or 330 ns.

Figure 9C:
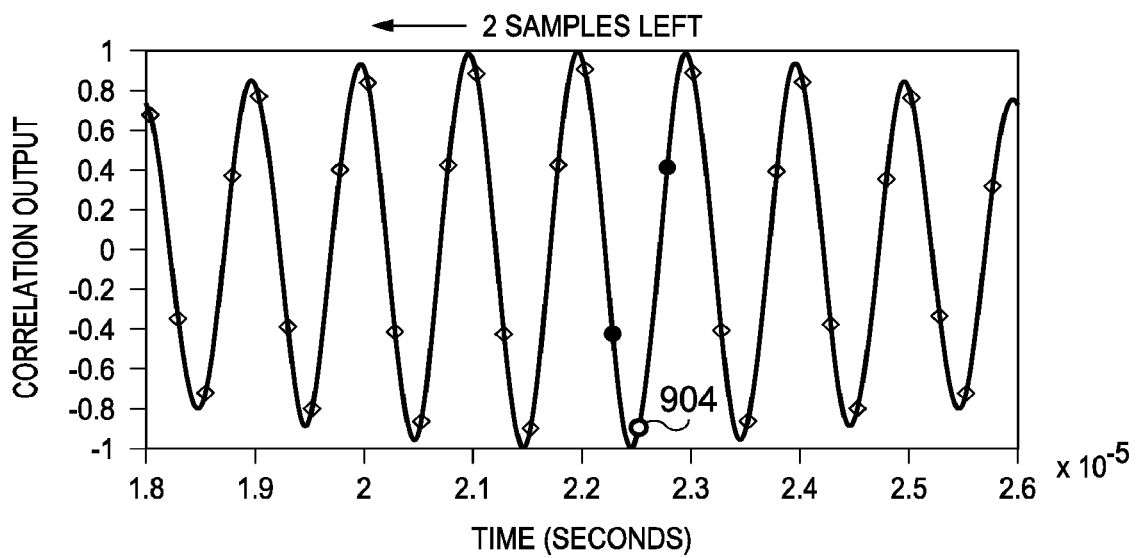

FIG. 9C illustrates a third example of the flow chart of FIG. 8 for the cross correlation waveform of FIG. 9A. Here, the timing offset between upstream and downstream waveforms is 580 ns (80 ns+500 ns) and cross correlation sample 904 is the cross correlation value of the initial k index at block 700. At block 704, k' is initially set equal to k. (FIG. 7A). Block 706 tests whether CORR(k'−1) is greater than CORR(k'). Sample CORR(k'−1) is the first sample to the left of sample 904 and is greater than CORR(k'). Block 708 then subtracts one from k', so that CORR(k') effectively moves one sample to the left to what was previously CORR(k'−1). Block 706 again tests whether CORR(k'−1) is greater than CORR(k'). CORR(k'−1) is the second sample to the left of sample 904 and is greater than CORR(k'). Block 708 again subtracts one from k', so that CORR(k') effectively moves two samples to the left from sample 904. Block 706 again tests whether CORR(k'-1) is greater than CORR(k'). This time the test is false and control passes to block 710. The test at block 710 is also false, and block 714 sets SAMP_OFFSET to two. Since the time difference of upstream and downstream waveforms crossing a threshold (θ1, θ2 FIG. 5E) is greater than a sample time (1/fs) LEAD_LAG=2. But the test at block 802 is false, because SAMP_OFFSET=2.

The test at block 804 is false, because the product of LEAD_LAG and fc/fs is less than 0.6. Thus, block 806 will set ΔTOF to 500 ns+80 ns or 580 ns.

Figure 9D:
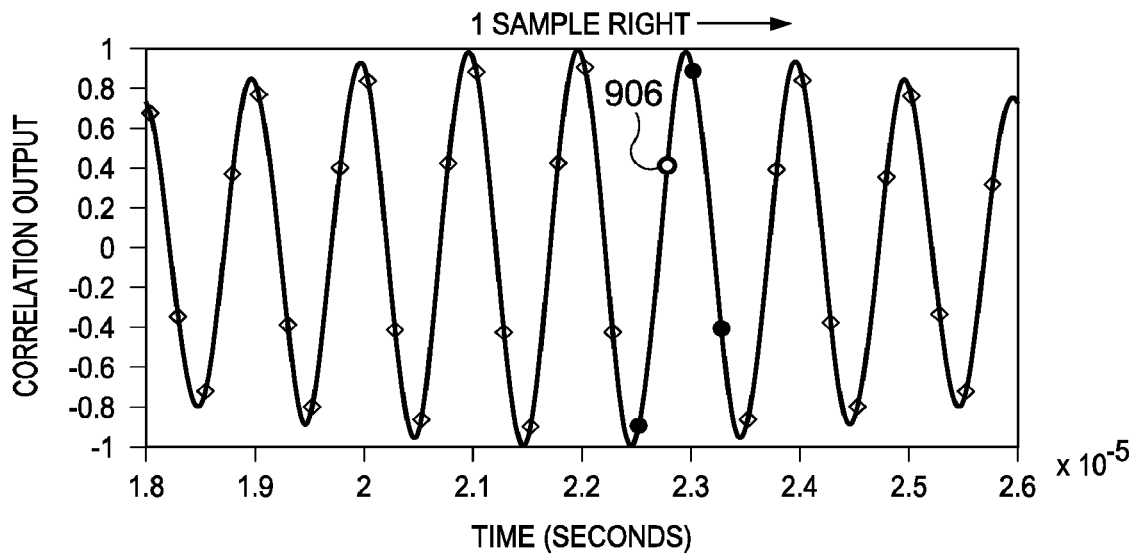

FIG. 9D illustrates a fourth example of the flow chart of FIG. 8 for the cross correlation waveform of FIG. 9A. Here, the timing offset between upstream and downstream waveforms is 830 ns (80 ns+750 ns) and cross correlation sample 906 is the cross correlation value of the initial k index at block 700. At block 704, k' is initially set equal to k. (FIG. 7A). Block 706 tests whether CORR(k'−1) is greater than CORR(k'). Sample CORR(k'−1) is the first sample to the left of sample 906 and is less than CORR(k'). Control then passes to block 710. Block 710 tests whether CORR(k'+1) is greater than CORR(k'). CORR(k'+1) is the first sample to the right of sample 906 and is greater than CORR(k'). Block 712 then adds one to k', so that CORR(k') effectively moves one sample to the right from sample 906. Block 710 again tests whether CORR(k'+1) is greater than CORR(k'). This time the test is false and control passes to block 714, and SAMP_OFFSET is set to −1. Since the time difference of upstream and downstream waveforms crossing a threshold (θ1, θ2 FIG. 5E) is greater than a sample time (1/fs) LEAD_LAG=3. The test at block 802 is true, because SAMP_OFFSET=−1. Thus, a cycle slip has occurred. Thus, block 808 will set ΔTOF to 1000 ns−250 ns+80 ns or 830 ns.

Figure 9E:
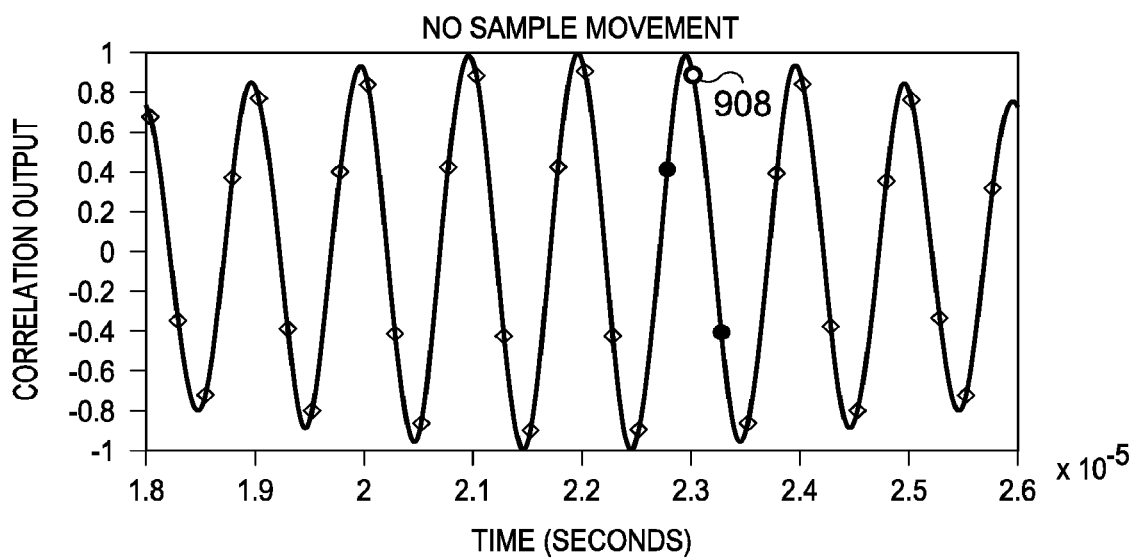

FIG. 9E illustrates a fifth example of the flow chart of FIG. 8 for the cross correlation waveform of FIG. 9A. Here, the timing offset between upstream and downstream waveforms is 1080 ns (80 ns+1000 ns) and cross correlation sample 908 is the cross correlation value of the initial k index at block 700. At block 704, k' is initially set equal to k. (FIG. 7A). Both tests at block 706 and 710 are false, so CORR(k') is not moved, and SAMP_OFFSET is set to zero by block 714. Since the time difference of upstream and downstream waveforms crossing a threshold (θ1, θ2 FIG. 5E) is greater than a sample time (1/fs) LEAD_LAG=4 (FIG. 5F or 5G). The test at block 802 is false, because SAMP_OFFSET=0. Control then passes to block 804. The test at block 804 is true, because the product of LEAD_LAG and fc/fs is 1. Thus, a cycle slip has occurred, and block 808 will set ΔTOF to 1000 ns+80 ns or 1080 ns.

Figure 10A:
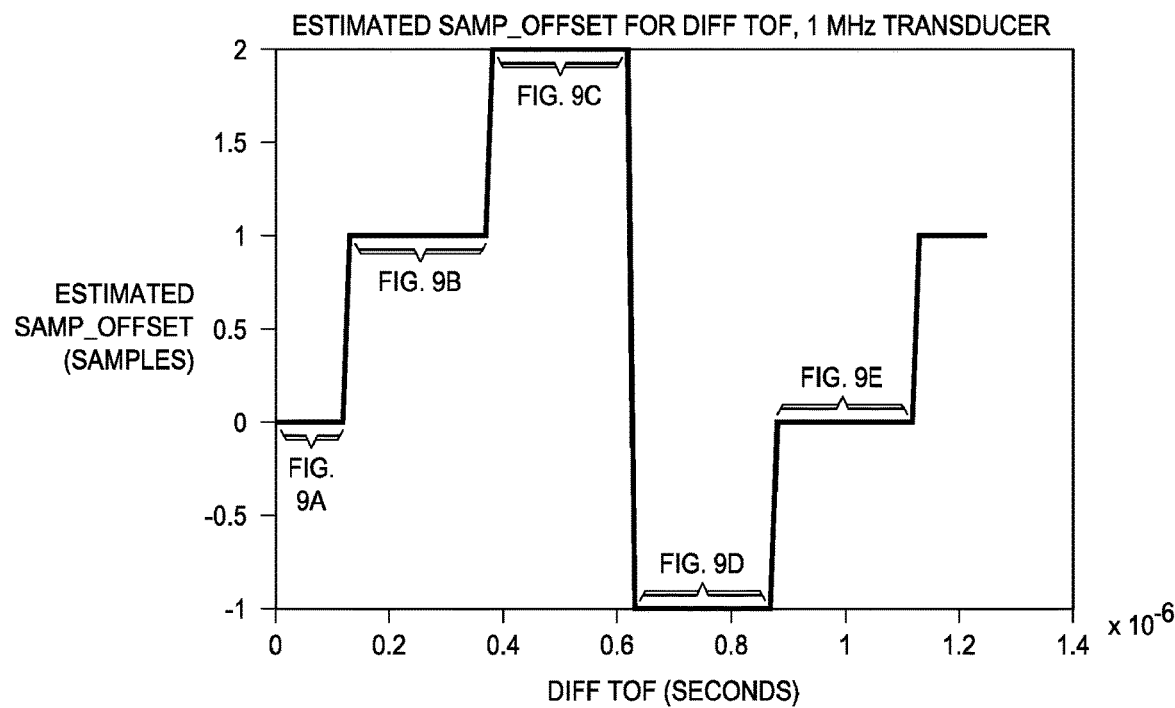
FIG. 10A is a diagram showing estimated sample offset for FIGS. 9A through 9E.

Turning now to FIG. 10A, there is a diagram showing estimated sample offset for FIGS. 9A through 9E as a function of differential time of flight. As previously discussed, the estimated value of SAMP_OFFSET is 0 for the example of FIG. 9A, 1 for the example of FIG. 9B, and 2 for the example of FIG. 9C. In each case of FIGS. 9A through 9C, no cycle slip occurs. The differential time of flight is determined by 0, 1, or 2 respective sample slips. In the example of FIG. 9D, a cycle slip has occurred, but SAMP_OFFSET is −1. The differential time of flight, therefore, is 1000 ns−250 ns+80 ns or 830 ns. Finally, the example of FIG. 9E is the same as in FIG. 9A except that the initial correlation value 908 is displaced by one cycle with respect to correlation value 900. The differential time of flight, therefore, is 1000 ns+80 ns=1080 ns. The pattern of FIG. 10A repeats for increasing differential delay offsets.

Figure 10B:
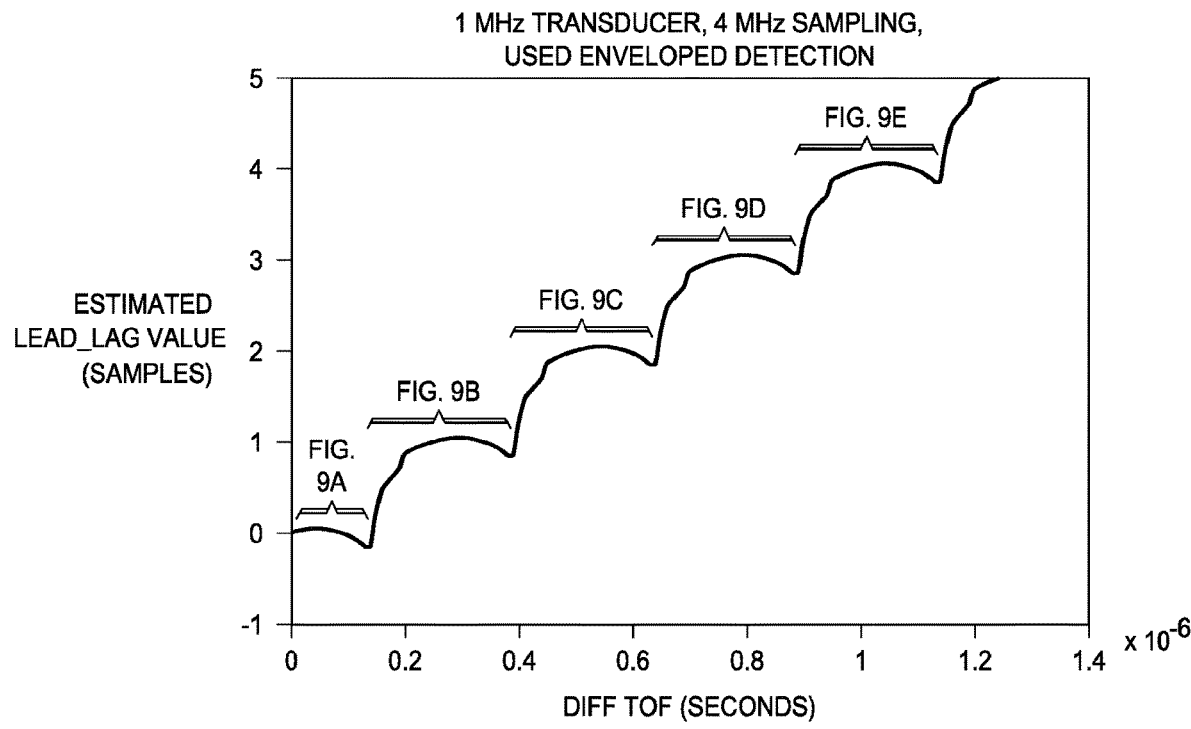
FIG. 10B is a diagram showing estimated lead lag values for FIGS. 9A through 9E.
Figure 10C:
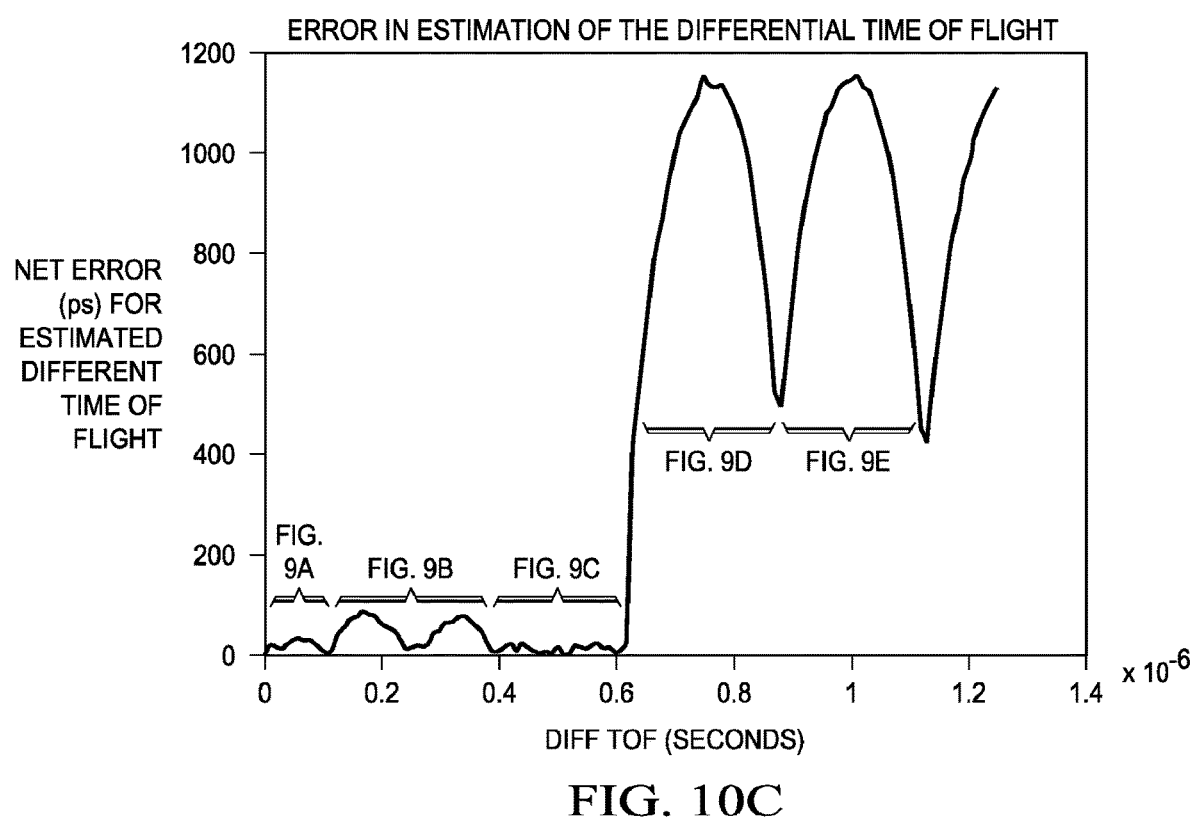
FIG. 10C is a diagram of estimated errors of differential time of flight (ΔTOF) for FIGS. 9A through 9E.

FIG. 10B is a diagram showing estimated LEAD_LAG values for FIGS. 9A through 9E as a function of differential time of flight. Recall that the LEAD_LAG value from FIG. 5F or 5G is an average of two time of flight (TOF1 and TOF2) measurements. Each time of flight measurement is a time difference between a time y1 and y2 envelopes cross a threshold (θ1, θ2 FIG. 5E). FIG. 10C is a diagram of estimated errors of differential time of flight (ΔTOF) for FIGS. 9A through 9E. Recall that no cycle slip was detected for the examples of FIGS. 9A through 9C, and errors are less than 0.1 ns. Examples of FIGS. 9D and 9E include compensation for both cycle slip and sample slip. Here, however, maximum errors are less than 1.2 ns.

FIG. 11 is a summary table showing a standard deviation for various lead lag and sample offset values. The first column shows differential delay offsets from 0 to 1.25 μs in 50 ns increments. The second and third columns show corresponding values for Re_LL and SAMP_OFFSET. The fourth column shows the corresponding standard deviation for each differential delay offset. The present invention advantageously compensates for sample slip and cycle slip. The present invention provides improved accuracy with small standard deviation over a wide range of differential delay offset values.

In yet another embodiment of the present invention, the method disclosed in U.S. Nonprovisional application Ser. No. 14/051,623 (TI-72924), filed Oct. 11, 2013, may be used to obtain a second independent estimate of differential time of flight rather than the cross correlation method of equation [6]. Recall that received signals of FIG. 2A are given by equations [4] and [5]. These signals are received alternately so that transducer $UT_1$ transmits when transducer $UT_2$ receives, and transducer $UT_2$ transmits when transducer $UT_1$ receives. The received signals may be applied to quadrature mixer circuits 204 and 206 (FIG. 2 of U.S. Nonprovisional application Ser. No. 14/051,623). Mixer circuit 204 multiplies the received signal by the modulating signal $\sin(2\pi(f_C+\delta f)t)$ and applies the resulting in phase signal to a low pass filter. Mixer circuit 206 multiplies the received signal by the modulating signal $\cos(2\pi(fC+\delta f)t)$ and applies the resulting quadrature signal to a low pass filter. Here, δf is a frequency error term of the mixer frequency with respect to the transducer center frequency. The output signals from in phase mixer 204 are given by equations [10] and [11]. The output signals from quadrature mixer 206 are given by equations [12] and [13].

$$r_I^{12}=f(t)\sin(2\pi f_C t)\sin(2\pi(f_C+\delta f)t) \qquad [10]$$

$$r_I^{21}(t)=f(t+\delta t)\sin(2\pi f_C(t+\delta t))\sin(2\pi(f_C+\delta f)t) \qquad [11]$$

$$r_Q^{12}(t)=f(t)\sin(2\pi f_C t)\cos(2\pi(f_C+\delta f)t) \qquad [12]$$

$$r_Q^{21}(t)=f(t+\delta t)\sin(2\pi f_C(t+\delta t))\cos(2\pi(f_C+\delta f)t) \qquad [13]$$

The output signals of equations [10] and [11] are filtered to produce filtered output signals given by equations [14] and [15], respectively. Likewise, the output signals of equations [12] and [13] are filtered to produce filtered output signals given by equations [16] and [17], respectively. Here, the signal pair of equations [15] and [17] is not a delayed version of the signal pair of equations [14] and [16]. By way of contrast, the received signal of equation [5] is a delayed version of the signal of equation [4].

$$\tilde{r}_I^{12}(t)=f(t)\sin(2\pi\delta ft) \qquad [14]$$

$$\tilde{r}_I^{21}(t)=f(t+\delta t)\sin(2\pi(f_C\delta t+\delta ft)) \qquad [15]$$

$$\tilde{r}_Q^{12}(t)=f(t)\cos(2\pi\delta ft) \qquad [16]$$

$$\tilde{r}_Q^{21}(t)=f(t+\delta t)\cos(2\pi(f_C\delta t+\delta ft)) \qquad [17]$$

The filtered analog signals of equations [14] through [17] are then converted to digital signals. A second independent estimate of differential time of flight is then given by the digital signals of equation [18].

$$\delta t = \operatorname{atan}\left(\frac{\tilde{r}_Q^{21}(t)}{\tilde{r}_I^{21}(t)}\right) - \operatorname{atan}\left(\frac{\tilde{r}_Q^{12}(t)}{\tilde{r}_I^{12}(t)}\right) \qquad [18]$$

Still further, while numerous examples have thus been provided, one skilled in the art should recognize that various modifications, substitutions, or alterations may be made to the described embodiments while still falling within the inventive scope as defined by the following claims. For example, alignment points of received ultrasonic waveforms may be generated for positive half cycles, negative half cycles, of both. Likewise, linear zero crossing alignment points may be generated from received ultrasonic waveforms for positive slope, negative slope, or both. Moreover, peak and zero crossing alignment point calculation may only be necessary for relatively low sampling frequency or for greater accuracy. Otherwise, selected local sample values near half cycle peaks or zero crossings may be used as alignment points. Other combinations will be readily apparent to one of ordinary skill in the art having access to the instant specification.

What is claimed is:

1. A method comprising;
receiving, at an ultrasonic measurement circuit, a first ultrasonic signal through a material;
receiving, at the ultrasonic measurement circuit, a second ultrasonic signal through the material;
generating, by the ultrasonic measurement circuit first sampled signals from the first ultrasonic signal;
generating, by the ultrasonic measurement circuit, second sampled signals from the second ultrasonic signal;
determining, by the ultrasonic measurement circuit and from the first sampled signals, consecutive first and second ones of the first sampled signals. in which the first one of the first sampled signals has a signal value below a threshold, and the second one of the first sampled signals has a signal value above the threshold;
determining, by the ultrasonic measurement circuit, a first time based on the second one of the first sampled signals;
determining, by the ultrasonic measurement circuit and from the second sampled signals, consecutive first and second ones of the second sampled signals, in which the first one of the second sampled signals has a signal value below the threshold, and the second one of the second sampled signals has a signal value above the threshold;
determining, by the ultrasonic measurement circuit, a second time based on the second one of the second sampled signals; and
determining, by the ultrasonic measurement circuit, a velocity of the material based on the first time and the second time.

2. The method of claim 1, wherein determining the velocity of the material includes:
determining, by the ultrasonic measurement circuit, a sample offset between the first and second sampled signals based on a cross-correlation operation between the first and second sampled signals; and
determining, by the ultrasonic measurement circuit, the velocity based on the sample offset.

3. The method of claim 2, wherein determining the velocity includes:
determining, by the ultrasonic measurement circuit, a frequency of the first and second ultrasonic signals;
determining, by the ultrasonic measurement circuit and based on the first and second times, a lead-lag indicator indicating: whether the first ultrasonic signal leads or lags the second ultrasonic signal; and a lead time or a lag time between the first and second ultrasonic signals; and
based on the lead-lag indicator and the sample offset, determining, by the ultrasonic measurement circuit, the velocity based on one of: the sample offset, or the sample offset and the frequency.

4. The method of claim 1, further comprising:
causing, by a control circuit including the ultrasonic measurement circuit, a first transducer to transmit the first ultrasonic signal; and
causing, by the control circuit, a second transducer to transmit the second ultrasonic signal.

5. The method of claim 1, wherein determining the velocity includes:
determining, by the ultrasonic measurement circuit, a first maximum value based on the first, sampled signals;
determining, by the ultrasonic measurement circuit, a second maximum value based on the second sampled signals;
determining, by the ultrasonic measurement circuit, first normalized signals based on normalizing the first sampled signals with the first maximum value; and
determining, by the ultrasonic measurement circuit, second normalized signals based on normalizing the second sampled signals with the second maximum value; and
determining, by the ultrasonic measurement circuit, the velocity based on the first and second normalized signals.

6. A system comprising:
a first transducer configured to transmit a first signal at a first time and receive a second signal at a second time;
a second transducer configured to receive the first signal and transmit the second signal;
an analog-to-digital converter (ADC) having first and second ADC inputs and an ADC output, the first ADC input coupled to the first transducer, the second ADC input coupled to the second transducer, and the ADC configured to:
receive, from the first transducer, the second signal through a material;
receive, from the second transducer, the first signal through the material;
provide first, sampled signals at the ADC output based on sampling the first signal; and
provide second sampled signals at the ADC output based on sampling the second signal; and
a processing circuit having a processing input and a processing output, the processing input coupled to the ADC output, and the processing circuit configured to:
determine, from the first sampled signals, consecutive first and second ones of the first sampled signals, in which the first one of the first sampled signals has a signal value below a threshold, and the second one of the first sampled signals has a signal value above the threshold;
determine a first time based on the second one of the first sampled signals;
determine, from the second sampled signals, consecutive first and second ones of the second sampled signals, in which the first one of the second sampled signals has a signal value below the threshold, and the second one of the second sampled signals has a signal value above the threshold;
determine a second time based on the second one of the second sampled signals; and
provide, at the processing output, a signal representing a velocity of the material based on the first time and the second time.

7. The system of claim 6, wherein the processing circuit is configured to:
determine a sample offset between the first and second sampled signals based on a cross-correlation operation between the first and second sampled signals; and
determine the velocity based on the sample offset.

8. The system of claim 7, wherein the processing circuit is configured to:
determine a frequency of the first and second signals;
determine, based on the first and second times, a lead-lag indicator indicating: whether the first signal leads or lags the second signal; and a lead time or a lag time between the first and second signals; and
based on the lead-lag indicator and the sample offset, determine the velocity based on one of: the sample offset, or the sample offset and the frequency.

9. The system of claim 6, wherein the processing circuit is configured to:
determine a first maximum value based on the first sampled signals;
determine a second maximum value based on the second sampled signals;
determine first normalized signals based on normalizing the first sampled signals with the first maximum value;
determine second normalized signals based on normalizing the second sampled signal with the second maximum value; and
determine the velocity based on the first and second normalized signals.

10. The method of claim 5, further comprising:
determining, by the ultrasonic measurement circuit, the threshold based on the first or second maximum values.

11. The method of claim 1, wherein:
determining the first time includes:
determining, by the ultrasonic measurement circuit, a first envelope of the first sampled signals based on the first and second ones of the first sampled signals; and
determining, by the ultrasonic measurement circuit, the first time representing an intersection between the first envelope and the threshold; and
determining the second time includes:.
determining, by the ultrasonic measurement circuit, a second envelope of the second sampled signals based on the first and second ones of the second sampled signals; and
determining, by the ultrasonic measurement circuit, the second time representing an intersection between the second envelope and the threshold.

12. The method of claim 1, wherein the second one of the first sampled signals is generated by sampling the first ultrasonic signal at the first time; and
wherein the second one of the second sampled signals is generated by sampling the second ultrasonic signal at the second time.

13. The method of claim 1, wherein the threshold is a first threshold, and the method further comprises:
determining, by the ultrasonic measurement circuit and from the first sampled signals, consecutive third and fourth ones of the first sampled signals, in which the first one of the first sampled signals has a signal value below a second threshold, and the second one of the first sampled signals has a signal value above the second threshold, in which the second threshold is below the first threshold;
determining, by the ultrasonic measurement circuit, a third time based on the fourth one of the first sampled signals;
determining, by the ultrasonic measurement circuit and from the second sampled signals, consecutive third and fourth ones of the second sampled signals, in which the third one of the second sampled signals has a signal value below the second threshold, and the fourth one of the second sampled signals has a signal value above the second threshold;
determining, by the ultrasonic measurement circuit, a second time based on the fourth one of the second sampled signals; and
wherein determining the velocity includes determining the velocity based on the first, second, third, and fourth times.

14. The method of claim 13, wherein determining the velocity includes:
determining a first time-of-flight based on a first difference between the first time and the second time;
determining a second time-of-flight based on a second difference between the third time and the fourth time; and
determining the velocity based on the first and second time-of-flights.

15. The method of claim 13, wherein:
determining the third time includes:
determining, by the ultrasonic measurement circuit, a third envelope of the first sampled signals based on the third and fourth ones of the first sampled signals; and
determining, by the ultrasonic measurement circuit, the third time representing an intersection between the third envelope and the threshold; and
determining the second time includes:
determining, by the ultrasonic measurement circuit, a fourth envelope of the second sampled signals based on the third and fourth ones of the second sampled signals; and
determining, by the ultrasonic measurement circuit, the fourth time representing an intersection between the fourth envelope and the threshold.

16. The method of claim 13, wherein the fourth one of the first sampled signals is generated by sampling the first ultrasonic signal at the third time; and
wherein the fourth one of the second sampled signals is generated by sampling the second ultrasonic signal at the fourth time.

17. The system of claim 9, wherein the processing circuit is configured to determine the threshold based on the first or second, maximum values.

18. The system of claim 6, wherein the processing circuit is configured to:
determine a first envelope of the first sampled signals based on the first and second ones of the first sampled signals; and
determine the first time representing an intersection between the first envelope and the threshold;
determine a second envelope of the second sampled signals based on the first and second ones of the second sampled signals; and determine the second time representing an intersection between the second envelope and the threshold.

19. The system of claim 6. wherein the ADC is configured to generate the second one of the first sampled signals by sampling the first signal at the first time, and generate the second one of the second sampled signals by sampling the second signal at the second time.

* * * * *